United States Patent [19]

Moriyama et al.

[11] Patent Number: 4,736,238

[45] Date of Patent: Apr. 5, 1988

[54] FULLY DIGITIZED VIDEO SIGNAL REPRODUCING APPARATUS

[75] Inventors: Yoshiaki Moriyama; Sumitaka Matsumura; Kaname Abe; Akihiro Ono; Kenji Yamagata; Toshio Gotoh, all of Tokorozawa, Japan

[73] Assignee: Pioneer Electronic Corporation, Tokyo, Japan

[21] Appl. No.: 941,242

[22] Filed: Dec. 12, 1986

[30] Foreign Application Priority Data

Dec. 13, 1985 [JP] Japan .................. 60-280711

[51] Int. Cl.⁴ .................. H04N 9/50; H04N 9/45
[52] U.S. Cl. .................. 358/19; 358/23; 358/310; 358/314; 358/21 R
[58] Field of Search .................. 358/17, 19, 21 R, 23, 358/330, 314, 310, 312

[56] References Cited

U.S. PATENT DOCUMENTS

| | | | |
|---|---|---|---|
| 4,069,499 | 1/1978 | Ninomiya | 358/19 |
| 4,395,729 | 7/1983 | Lewis, Jr. | 358/19 X |
| 4,531,148 | 7/1985 | Ohta et al. | 358/21 R |
| 4,556,900 | 12/1985 | Willis | 358/23 |
| 4,594,607 | 6/1986 | Lewis, Jr. et al. | 358/23 |
| 4,626,929 | 12/1986 | Ichinoi et al. | 358/310 |

Primary Examiner—Howard W. Britton
Assistant Examiner—Victor R. Kostak
Attorney, Agent, or Firm—Sughrue, Mion, Zinn, Macpeak & Seas

[57] ABSTRACT

A digital television circuit in which the analog FM video signal is first digitized and all processing is performed digitally, including FM demodulation. Clocks at the subcarrier frequency and four times this frequency are synchronized with the horizontal synchronizing circuit or color burst signal.

3 Claims, 22 Drawing Sheets

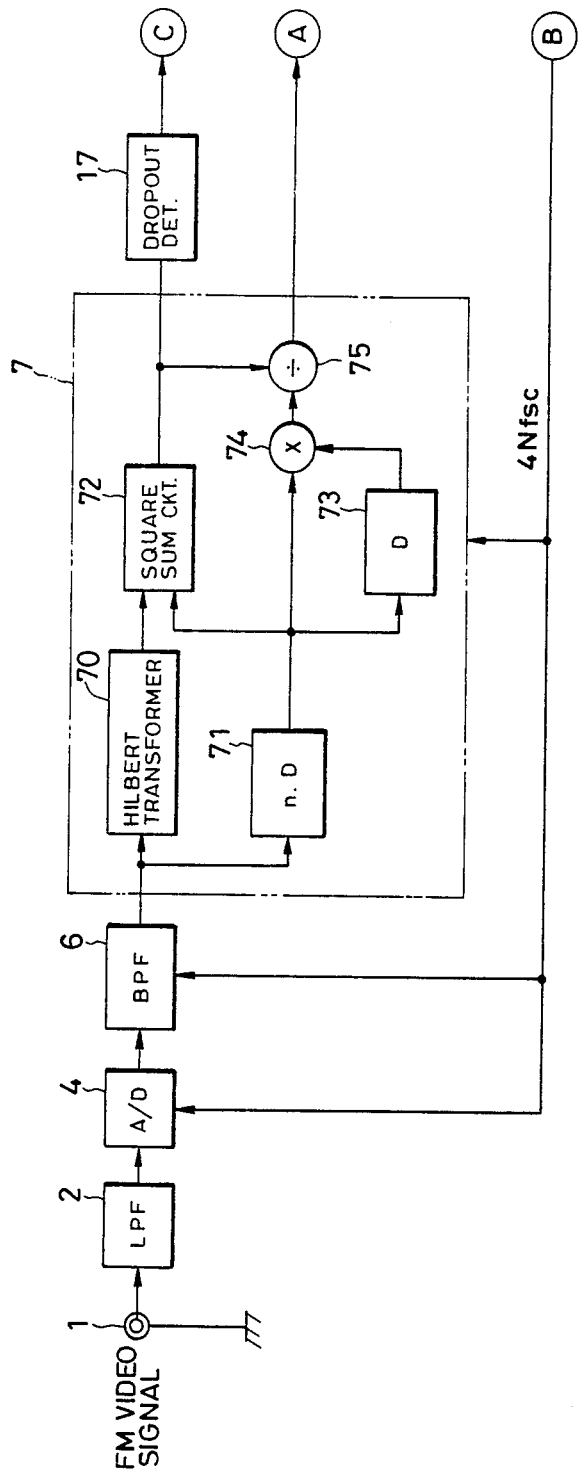

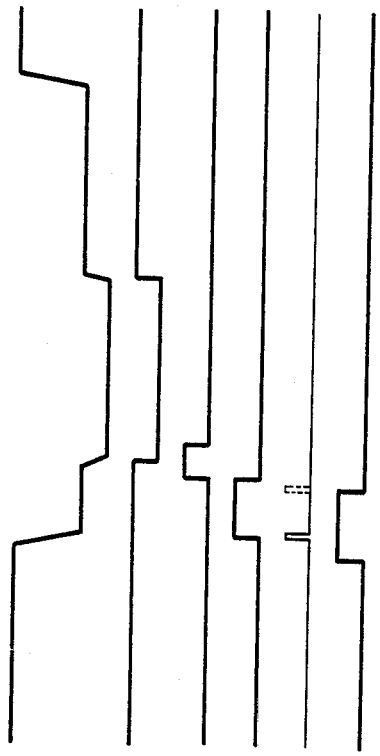
FIG. 15A
FIG. 15B
FIG. 15C
FIG. 15D
FIG. 15E
FIG. 15F
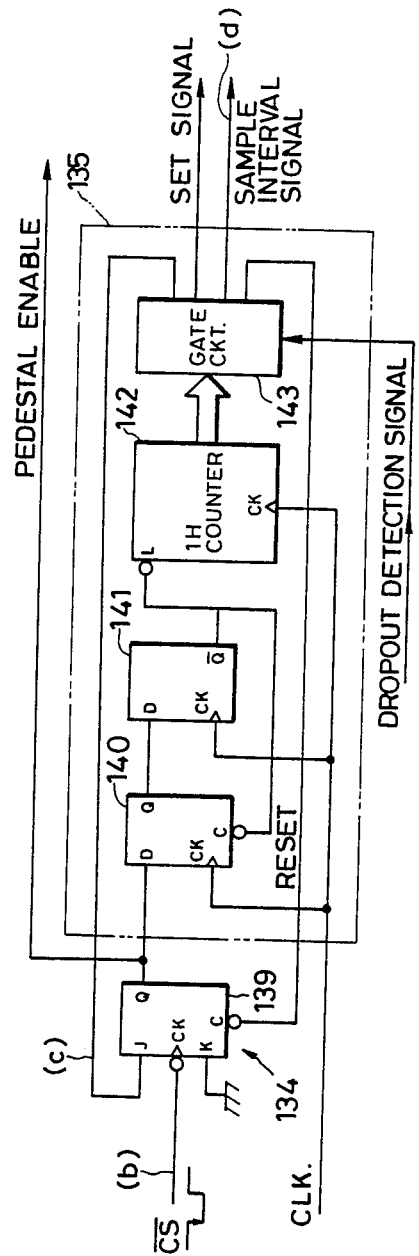
FIG. 16

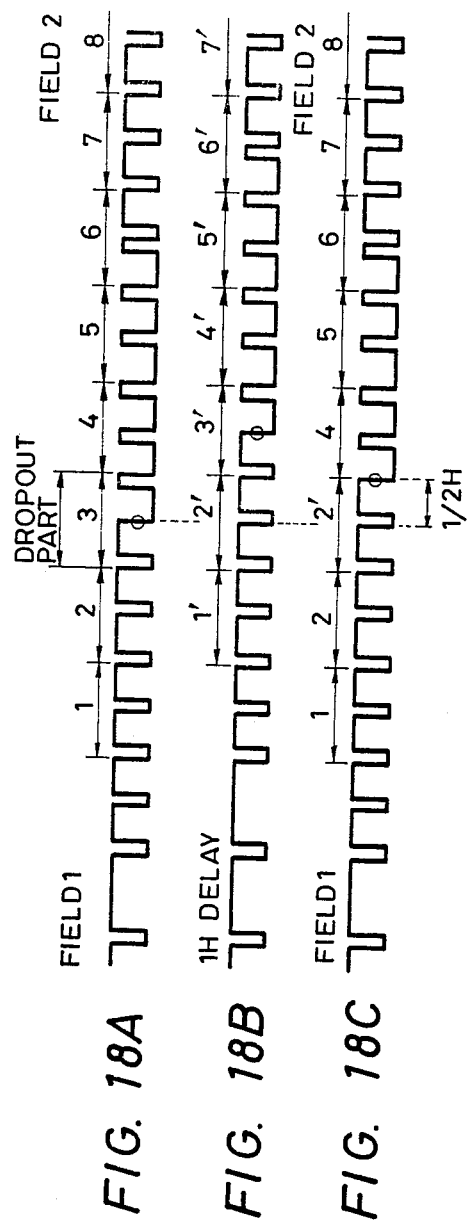

| A\B | 1111 | 1110 | 1101 | 1100 | 1011 | 1010 | 1001 | 1000 |
|---|---|---|---|---|---|---|---|---|
| 0000 | 0000 | 0000 | 0000 | 0000 | 0000 | 0000 | 0000 | 0000 |
| 0001 | 1000 | 0101 | 0100 | 0011 | 0011 | 0010 | 0010 | 0001 |
| 0010 | 1011 | 1000 | 0110 | 0101 | 0101 | 0100 | 0011 | 0011 |
| 0011 | 1100 | 1001 | 1000 | 0111 | 0110 | 0101 | 0101 | 0100 |
| 0100 | 1101 | 1011 | 1001 | 1000 | 0111 | 0110 | 0110 | 0101 |
| 0101 | 1101 | 1011 | 1010 | 1001 | 1000 | 0111 | 0110 | 0110 |
| 0110 | 1110 | 1100 | 1011 | 1010 | 1001 | 1000 | 0111 | 0110 |
| 0111 | 1110 | 1100 | 1011 | 1010 | 1001 | 1001 | 1000 | 0111 |

$$R' = \frac{R-Y}{1.14} \qquad B' = \frac{B-Y}{2.03}$$

FULLY DIGITIZED VIDEO SIGNAL REPRODUCING APPARATUS

BACKGROUND OF THE INVENTION

1. Field of the Invention

The present invention relates to a video signal reproducing apparatus, and particularly relates to an apparatus for the reproduction of a video signal recorded on a recording medium in a frequency-modulated form.

2. Prior Art

In a video disk player for reproducing a frequency-modulated video signal recorded on a recording medium, such as a video disk, generally, the signal processing of the frequency-modulated video signal (hereinafter abbreviated to "FM video signal") read out of the disk has been made in an analog manner.

In view of integrating the circuit, particularly in the case of using an integrated circuit, however, it is extremely advantageous to perform digital signal processing in comparison with analog processing. Further, when signal processing is performed digitally, it is possible to easily realize additional functions in the signal processing and to attain a high picture quality.

SUMMARY OF THE INVENTION

It is therefore an object of the present invention to provide a video signal reproducing apparatus in which signal processing for an FM video signal can be made digitally.

In order to attain the above object, according to an aspect of the present invention, the video signal reproducing apparatus comprises an analog-to-digital converter for converting an FM video signal into a digital signal and a first digital filter for extracting a video signal component necessary for detecting a video signal from the output of the analog-to-digital converter. An FM detecting circuit demodulates the output of the first digital filter. A second digital filter extracts a baseband video signal component from the output of the FM detecting circuit. A buffer memory stores the output of the second digital filter by using a clock signal synchronized with a horizontal synchronizing signal or a color burst signal contained in the output of the second digital filter and successively releases the stored information in synchronism with a predetermined reference clock signal. A digital-to-analog converter converts the digital video signal released from the buffer memory into an analog signal.

Other features and advantages of the invention will be apparent from the following description taken in connection with the accompanying drawings.

BRIEF DESCRIPTION OF THE DRAWINGS

FIGS. 1A and 1B are block diagrams showing an embodiment of the video signal reproducing apparatus according to the present invention.

FIGS. 15A-15F are a series of waveform diagrams showing the operation of the parts depicted in FIG. 14.

FIG. 16 is a block diagram showing a specific arrangement of the fall detecting circuit and the timing signal generating circuit depicted in FIG. 14.

FIGS. 18A-18C are a series of waveform diagrams for explaining the operation of the circuit of FIG. 17.

DESCRIPTION OF THE PREFERRED EMBODIMENTS

Referring to FIG. 1A, and FM video signal read from a recording medium, such as a video disk or the like, is fed from an input terminal 1 to an A/D (analog-to-digital) converter 4 via an analog LPF (low-pass filter) 2. Although the LPF 2 is provided to remove folded distortion at the A/D converter, the LPF 2 may be omitted if the amount of components above the frequency $f_s/2$ contained in the FM video signal is very little. Here, the frequency $f_s$ represents the sampling frequency in the A/D conversion. The digital FM video signal from the A/D converter 4 is fed to a digital BPF (band-pass filter) 6. The digital BPF 6 extracts only a signal component necessary for the video signal detection from the A/D converted output containing an FM audio signal and feeds the necessary extracted component to an FM detecting circuit 7 in the next stage.

Figure 2:
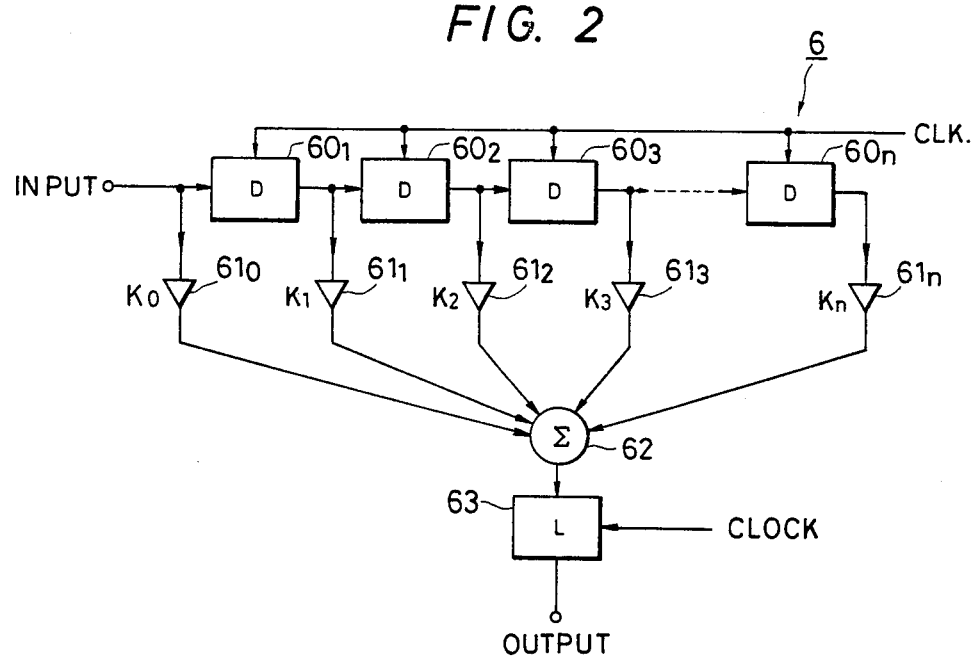
FIG. 2 is a block diagram showing a specific arrangement of the digital BPF depicted in FIG. 1A.

The digital BPF 6 may be, as shown in FIG. 2, an FIR filter (acyclic digital filter) which is constituted by serially connected delay circuits $60_1$ to $60_n$, each introducing a delay time of one clock period, multipliers $61_0$ to $61_n$ for multiplying the input signal of the first delay circuit $60_1$ and the output signals of the respective delay circuits $60_1$ to $60_n$ by respective multiplication factors $K_0$ to $K_n$. An adder 62 adds together the outputs of the multipliers $60_0$ to $60n$ and a latch circuit 63 latches the output of the adder 62. As a result, desired amplitude and group delay characteristics can be attained when the multiplication factors $K_0$ to $K_n$ of the multipliers $61_0$ to $61_n$ are suitably selected. Accordingly, in the case where group delay distortion is caused by the analog LPF 2, the group delay characteristic of the digital BPF 6 can be established to be inverse to that of the analog LPF 2 so that a digital FM video signal free from group delay distortion can be fed to the FM detecting circuit 7. On the other hand, in the case where the group delay distortion of the analog LPF 2 is of a negligible quantity or in the case where the analog LPF 2 is not used, the digital BPF 6 may be a phase-linear filter so that a signal free from group delay distortion can be obtained. In FIG. 2, when the factors $K_0$ to $K_n$ of the digital BPF 6 are symmetric with respect to the center ($K_0=K_n$, $K_1=K_{n-1}$, etc.), the filter becomes an ideal phase-linear filter.

For example, as shown in FIG. 1A, the FM detecting circuit 7 includes a Hilbert transformer 70 used for the Hilbert transformation of the digital FM video signal. A parallel delay circuit 71 delays the digital FM video signal for n sampling intervals. A square sum circuit 72 adds the squares of the respective output signals of the Hilbert transformer 70 and the delay circuit 71. Another delay circuit 73 delays the output signal of the n-period delay circuit 71 for one sampling interval. A multiplier 74 multiplies the output signal of the h-period delay circuit 71 by the output signal of the 1-period delay circuit 73. A divider 75 divides the output of the multiplier 74 by the output signal of the square sum circuit 72. The Hilbert transformer 7 is made up of a transversal filter and the like. The delay time of the delay circuit 71 corresponds to the delay time of the Hilbert transformer 70. The FM detecting circuit 7 of this type is disclosed in Japanese patent application No. 262481/1984, filed by the assignee of this application.

Figure 1B:
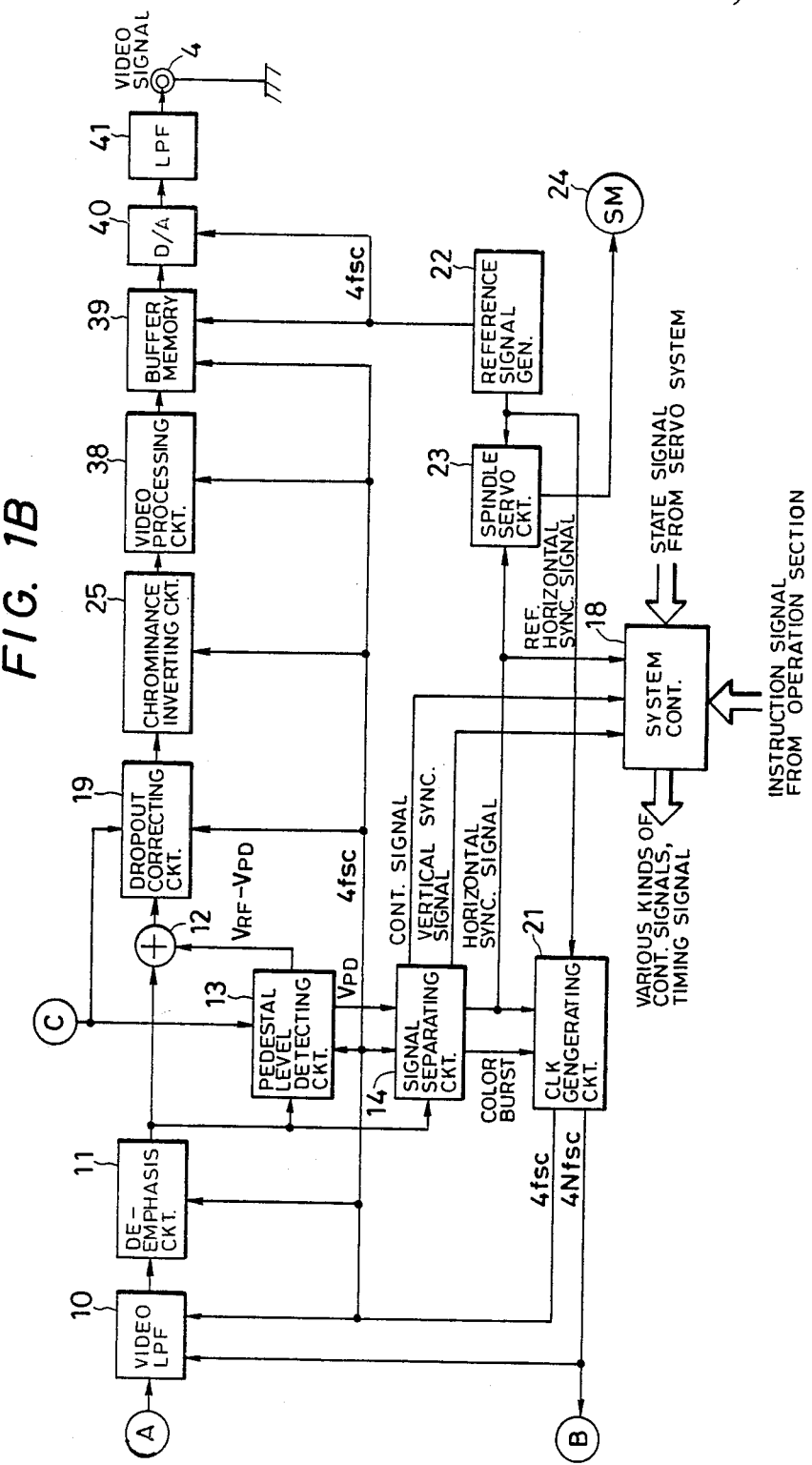
Figure 3:
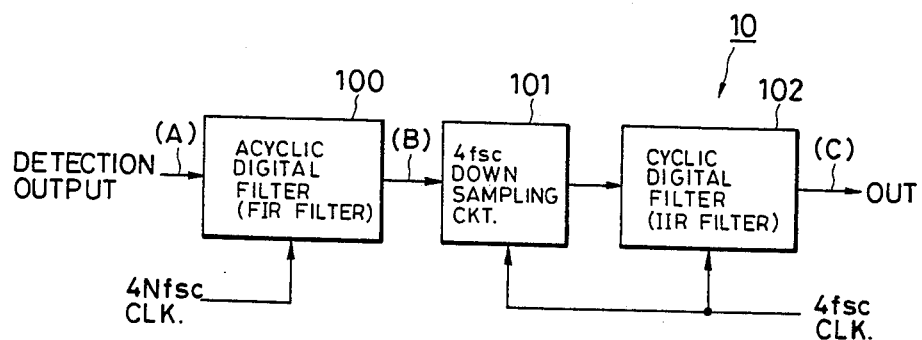
FIG. 3 is a block diagram showing an example of the arrangement of the video LPF depicted in FIG. 1B.

FIG. 1B, a video LPF 10 is supplied with the output of the FM detecting circuit 7 and extracts only a base-band component of the video signal from this output. For example, in the case of NTSC type, the cutoff frequency of the video LPF 10 is set to 4.2 MHz. FIG. 3 shows an example of the video LPF 10 which is composed of a phase-linear acyclic digital filter (FIR filter) 100, a down sampling circuit 101, and a cyclic digital filter (IIR filter) 102. The FIR filter 100 is disposed as the front stage so as to operate at a clock frequency of $4Nf_{sc}$ (N being an integer not smaller than 2) to remove a carrier component contained in the FM-detected digital video signal to thereby derive the base-band component. The down sampling circuit 101 is arranged to down-sample the output of the FIR filter 101 to a clock frequency of $4f_{sc}$. The IIR filter 102 is disposed as the rear stage and arranged to operate at the $4f_{sc}$ clock frequency to compensate the phase characteristic of the digital video signal.

Figure 4A:
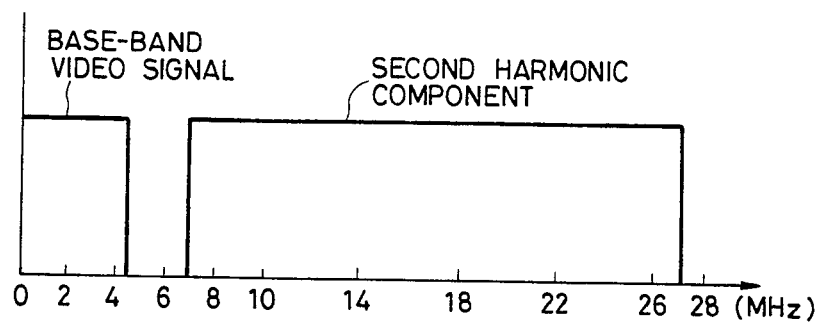
FIGS. 4A to 4C are spectral graphs depicted in FIGS. 3A to 3C.
Figure 4B:
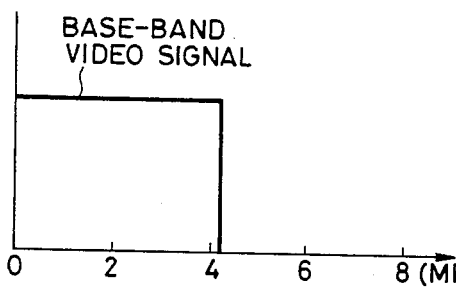
Figure 4C:
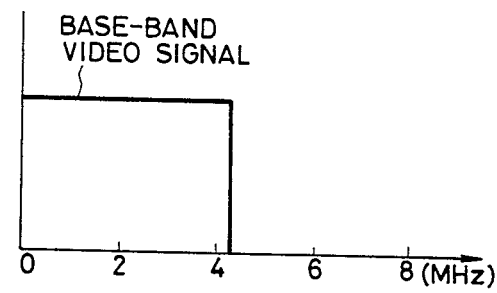

FIGS. 4A to 4C show the respective spectral distributions at the points (A) to (C) of FIG. 3. The FM detected output (A), containing a base-band video signal and a secondary harmonic component thereof, is filtered by the FIR filter 100 so that only the base-band video signal (B) is led out to the output terminal of the filter 100. The base-band component (B) is sampled down from the $4Nf_{sc}$ clock frequency to the $4f_{sc}$ clock frequency by the down sampling circuit 101. The spectral distribution after the down sampling is the same as that shown in FIG. 4B. The lowering of the sampling frequency effectuates production of sufficient time and reduction of hardware complexity. Because the bandwidth of the digital video signal is reduced to about 4.2 MHz by the filtering through the FIR filter 100, the sampling frequency can be lowered with no hindrance. After the down sampling, the base-band video signal (B) is filtered by the IIR filter 102 to thereby compensate the phase characteristic. The spectral distribution (C) after the phase compensation is the same as shown in FIG. 4B.

Figure 5:
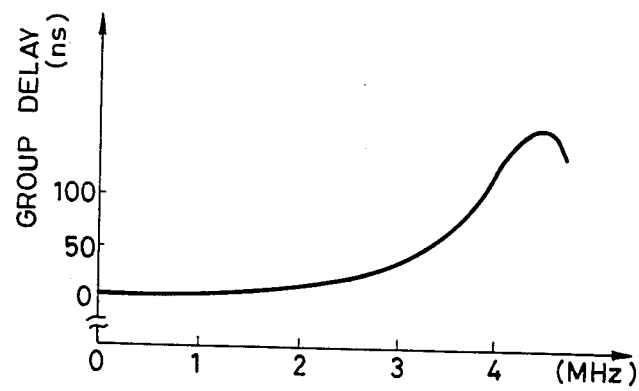
FIG. 5 is a phase characteristic graph of the IIR depicted in FIG. 3.

In the case of a video disk or the like, since the conventional signal reproducing system is designed to operate in an analog manner, information recording is performed while inversely distorting the phase of the video LPF to inversely compensate the phase distortion of the video LPF on the assumption that the phase turns through the video LPF designed in an analog manner. Accordingly, if the signal reproduced from a conventional video disk of this recording mode is processed in a digital manner, the inverse compensation effected in recording information should be further compensated. It is to be understood that the compensation of the phase characteristic is attained by the IIR filter 102. The phase characteristic of the IIR filter 102 is shown in FIG. 5.

Figure 6:
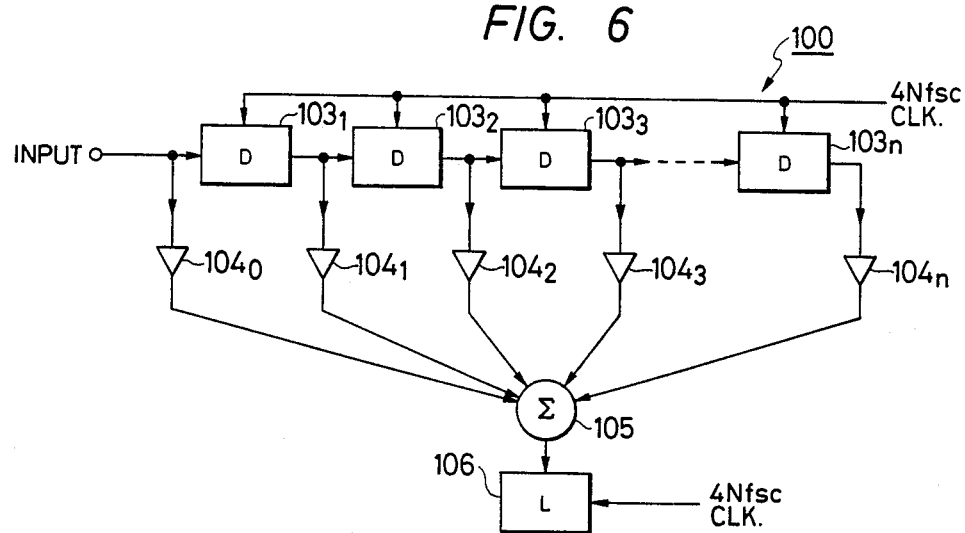
FIGS. 6 to 8 are block diagrams respectively showing a specific arrangement of the FIR filter, down-sampling circuit and IIR filter depicted in FIG. 3.
Figure 7:
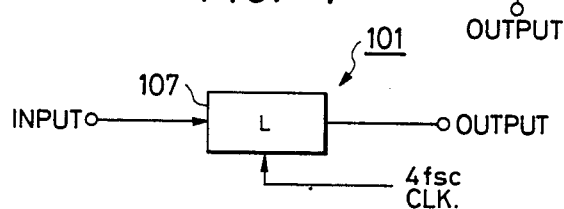
Figure 8:
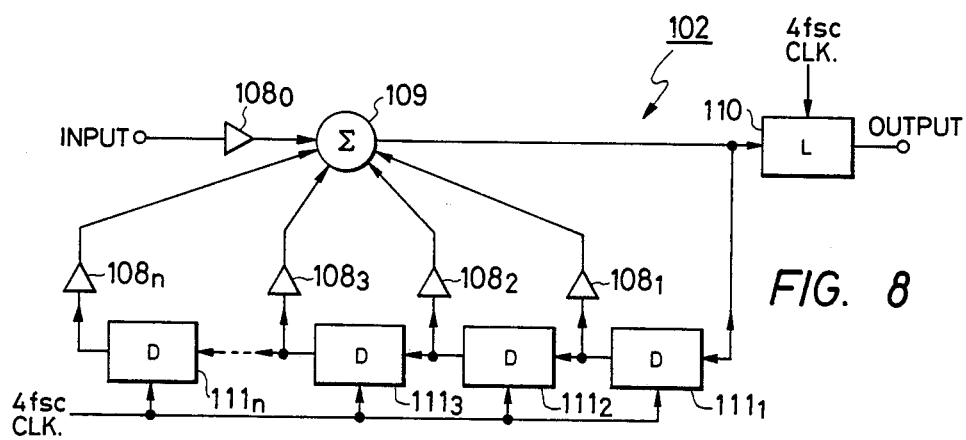

FIGS. 6 to 8 respectively show, by way of example, specific arrangements of the FIR filter 100, the down sampling circuit 101, and the IIR filter 102. In FIG. 6, the FIR filter 100 is constituted by serially connected delay circuits $103_1$ to $103_n$, each providing a time delay of one clock period. Multipliers $104_0$ to $104_n$ multiply the input signal of the first delay circuit $103_1$ and the respective output signals of all the delay circuits $103_1$ to $103_n$ by multiplication factors $K_0$ to $K_n$. An adder 105 adds the output of the multipliers $104_0$ to $104_n$. A latch circuit 106 made up of a D-type flip-flop or the like latches the output of the adder 105. The clock frequency supplied to the delay circuits $103_1$ to $103_n$ and to the latch circuit 106 is set to $4Nf_{sc}$. As shown in FIG. 7, the down sampling circuit 101 is constituted by a latch circuit 107 made up of a D-type flip-flop or the like. The clock frequency supplied to the circuit is set to $4f_{sc}$. Accordingly, data fed to the latch circuit 107 are output only every (N−1)-th piece of data.

As shown in FIG. 8, the IIR filter 102 is constituted by of a multiplier $108_0$ for multiplying the input signal by a multiplication factor $K_0$. An adder 109 takes the output of the multiplier $108_0$ as one input for addition. A latch circuit 110 made up of a D-type flip-flop or the like latches the output of the adder 109. Serially connected delay circuits $111_1$ to $111_n$ successively delays the output of the added 109 by one clock period. Multipliers $108_1$ to $108_n$ multiply the respective output signals of the delay circuits $111_1$ to $111_n$ by multiplication factors $K_1$ to $K_n$. The clock frequency supplied to the latch circuit 110 and the delay circuits $111_1$ to $111_n$ is set to $4f_{sc}$. In this circuit arrangement, the phase characteristic as shown in FIG. 5 can be attained when the respective multiplication factors $K_0$ to $K_n$ of the multipliers $108_0$ to $108_n$ are suitably selected.

In the case of the above-described video LPF 10, owing to the use of the phase linear FIR filter 100 disposed in the front stage, the phase compensation can be determined by the IIR filter 102 disposed at the rear stage and the amplitude characteristic can be adjusted without changing the phase characteristic.

Although it has been described that the down sampling is made in front of the IIR filter 102, this is because the IIR filter 102 should complete all operations within one clock period. If the down sampling is made in the rear of the IIR filter 102, pipe-line processing is impossible for the above-mentioned reason and operations should be reduced in number or high-speed elements should be used. However, each of these techniques has its limit. If the down sampling is made in front of the IIR filter 100 as described above, the clock period becomes long and, accordingly, operations can be increased in number to thereby stably obtain more exact characteristics.

Figure 9:
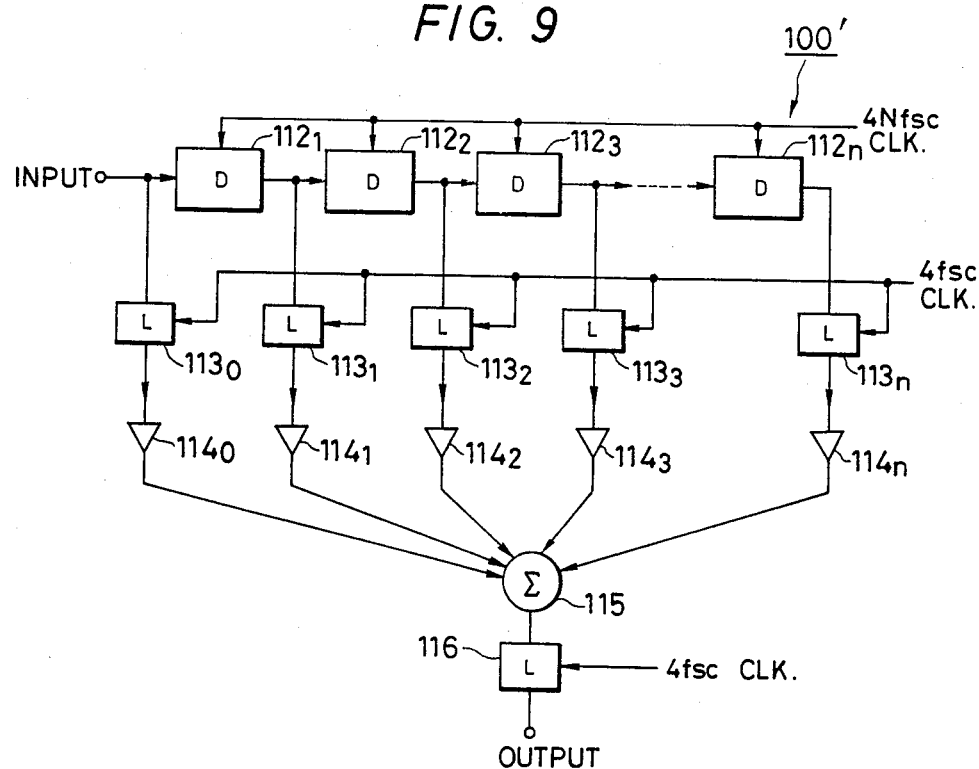
FIG. 9 is a block diagram showing another example of the arrangement of the video LPF.

The video LPF 10 described above is arranged such that the front-stage FIR filter 100 is caused to operate with a $4Nf_{sc}$ clock and the output of the FIR filter 100 is sampled down by the down sampling circuit 101 using a $4f_{sc}$ clock. However, the video LPF 10 may be, alternatively, arranged such that, as shown in FIG. 9, down sampling is made in front of the operation part within the FIR filter 100 and the operation and following parts are made to operate with a $4f_{sc}$ clock. In the case of FIG. 9, the down sampling circuit 101 is not used.

In FIG. 9, the FIR filter 100' is constituted by serially connected delay circuits $112_1$ to $112_n$ for time delaying by one clock period. Latch circuits $113_0$ to $113_n$ each made of a D-type flip-flop latch the input signal and the respective output signals of the delay circuits $112_1$ to $112_n$. Multipliers $114_0$ to $114_n$ multiply the respective output signals of the latch circuits $113_0$ to $113_n$ by multiplication factors $K_0$ to $K_n$ respectively. An adder 115 adds the respective output signals of the multipliers $114_0$ to $114_n$. A latch circuit 116 made up of a D-type flip-flop latches the output of the adder 115. The clock frequency at the delay circuits $112_1$ to $112_n$ is set to $4Nf_{sc}$. The clock frequency at the latch circuits $113_0$ to $113_n$ in the succeeding stage is set to $4f_{sc}$ and the clock frequency at the operation circuits in the final stage (the multipliers $114_0$ to $114_n$, the adder 115 and the latch circuit 116) is set to $4f_{sc}$.

Because operations in the FIR filter 100' are executed by a $4f_{sc}$ clock, unnecessary operations can be omitted. Furthermore, because the clock period becomes long, operations can be increased in number. Accordingly, the FIR filter 100' can be reduced in circuit size compared with the previously described FIR filter 100.

In order to make the FIR filter of FIG. 6 or 9 have a phase-linear characteristic, the factors $K_0$ to $K_n$ should be symmetrized with respect to the center ($K_0=K_n$, $K_1=K_{n-1}$, etc.) in the same manner as the digital BPF 6.

Returning to FIG. 1B, the digital video signal having passed through the video LPF 10 is fed, via a de-emphasis circuit 11, to an adder 12, a pedestal level detecting circuit 13 and a signal separating circuit 14 which constitute a pedestal clamping means.

In general, when digital signal processing is carried out, reducing the number n of quantized bits per word (bits/word) is apparently advantageous in circuit design. However, considering the output of FM detection, the output level is constant in the steady state of the disk player but varies in its unsteady state. In other words, the direct-current component of the video signal greatly varies in the unsteady state, such as the rising in rotation of a spindle motor 24, the searching or scanning in CVL (constant linear velocity) disk reproduction. If synchronizing signal detection becomes impossible in the unsteady state, the signal cannot be locked by a spindle servo circuit 23 and cannot be synchronized by a clock generating circuit 21. The unsteady state never changes to the steady state externally. Accordingly, it is required that the synchronizing signal can be detected even in the unsteady state. To this end, the number n of bits should be set on the basis of the unsteady state.

The number n of the bits supplied at least to the input of the signal separating circuit, that is, to the output of the de-emphasis circuit 11, is set to the number of bits $n_1$ (bits/word) of a dynamic range sufficiently wide for coping with the great change in pedestal level on the basis of the unsteady state. Thus, in the signal separating circuit 14, the synchronizing signal can be reliably detected from the FM detection output having passed through the de-emphasis circuit 11 not only in the steady state but even in the unsteady state.

In the pedestal level detecting circuit 13, the pedestal level $V_{PD}$ is detected and subtracted from a reference voltage $V_{RF}$ to produce an output ($V_{RF}-V_{PD}$) which is a difference obtained by the subtraction. This output is added to the digital video signal in the adder 12 to cancel the change in pedestal level to thereby pedestal-clamp the video signal in a digital manner. At the output of the adder 12, the pedestal-clamped data of $n_1$ (bits/word) is reduced in bit number to data of $n_2$ (bits/word) ($n_2<n_1$). The number $n_2$ is determined on the basis of the dynamic range and the resolution necessary for the video signal in the steady state. The bit reduction facilitates the circuit design on the adder 2 and other elements. Furthermore, not only in the steady state but also in the unsteady state, the signal level of the digital video signal is confined within a dynamic range of $n_2$ (bits/word) by the pedestal clamping. Accordingly, it is possible to see a picture even in the unsteady state, for example, in carrying out the scanning of CLV, or the like.

The foregoing embodiment shows the case where the dynamic range for the circuits constituting a digital signal processing system to the input of the signal separating circuit 14 is set to $n_1$ (bits/word) and bit-reduced to $n_2$ (bits/word) to make the dynamic range narrow in video processing after clamping the pedestal in a digital manner. However, the invention is not limited to this but the output of the digital FM detecting circuit may be separated into two system, which have different number of n of bits, as shown in FIG. 10.

Figure 10:
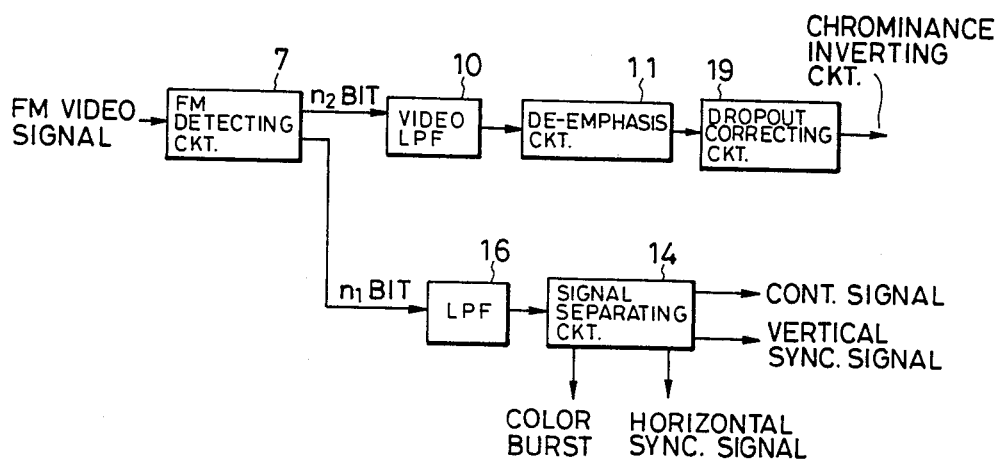
FIG. 10 is a block diagram showing another example of the arrangement of the bit reducing process depicted in FIG. 1B.

In other words, referring to FIG. 10, the number n of bits is set to a dynamic range of $n_1$ (bits/word) sufficiently wide for coping with a great change in pedestal level in the unsteady state. The $n_1$ (bits/word) data are fed to the signal separating circuit 14 through the LPF 16. Any filter may be used as the LPF 16 so long as the synchronizing signal can be detected from the output thereof. Accordingly, the arrangement can be simplified by using a simplified filter coefficient. On the other hand, with respect to video processing system, the number of bits is set to be a dynamic range of $n_2$ (bits/word) which is smaller than $n_1$ (bits/word). The number $n_2$ is determined on the basis of the dynamic range as well as the resolution required for the video signal in the steady state.

By separating the output signal of the digital FM detection into the two systems of $n_1$ and $n_2$ (bits/word) data, the circuit of the video LPF 10 and associated circuitry can be designated taking into consideration only the steady state. Accordingly, the circuit arrangement can be simplified. Furthermore, the synchronizing signal can be reliably detected even in the unsteady state, for example, in the acceleration of the spindle motor 24, or the like.

In the foregoing circuit arrangement, there occur occasions where the picture is invisible owing to the change in pedestal level in the unsteady state. This is based on such belief that it is sufficient if the picture can be seen in the steady state and if the synchronizing signal can be reliably detected in the unsteady state. In CLV scanning, however, the change in pedestal level is generally small because the clock generating circuit 21 is synchronized to some extent, so that, in this case, the picture can be seen.

Figure 11:
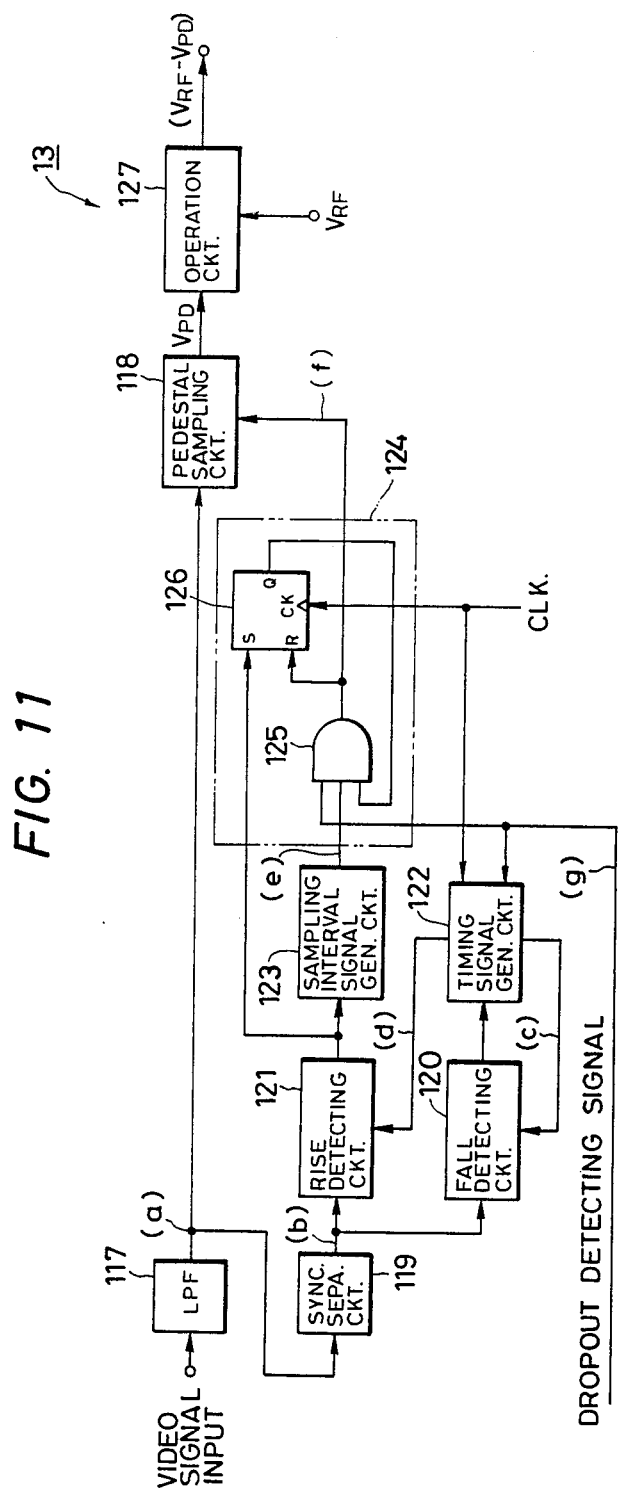
FIG. 11 is a block diagram showing an example of the arrangement of the pedestal level detecting circuit depicted in FIG. 1B.
Figure 12A:
FIGS. 12A-12G are a series of waveform diagrams showing the operation of the parts depicted in FIG. 11.
Figure 12B:
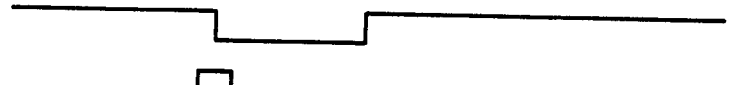
Figure 12C:
Figure 12D:
Figure 12E:
Figure 12F:
Figure 12G:

FIG. 11 is a block diagram showing an example of the arrangement of the pedestal level detecting circuit 13. In the drawing, the digital video signal (a), after color burst has been removed by an LPF 117, is fed to both a pedestal sampling circuit 118 and a synchronizing separating circuit 119. In the synchronizing separating circuit 119, the synchronizing signal (b) contained in the digital video signal (a) is separated from the digital video signal, and is fed to both a rise detecting circuit 121 and a fall detecting circuit 120. The fall detecting circuit 120 detects the trailing edge of the synchronizing signal (b) while a first gate signal (c) is being generated from a timing signal generating circuit 122. The rise detecting circuit 121 detects the leading edge of the synchronizing signal (b) while a second gate signal (d) is being generated from the same timing signal generating circuit 122.

The timing signal generating circuit 122 produces the first gate signal (c) on the basis of the clock signal when a drop-out detection signal (g) is not being generated from a drop-out detection circuit 17 which will be described later. On the other hand, the timing signal generating circuit 122 produces the second gate signal (d) on the basis of the fall detection timing owing to the fall detecting circuit 120 when a drop-out detection signal (g) is not being generated after the passage of a predetermined period of time. The sampling interval signal generating circuit 123 produces a sampling interval signal (e) for a predetermined period corresponding to the output of the rise detecting circuit 121, and the sampling interval signal (e) is fed to a pulse generating control circuit 124.

For example, the pulse generation control circuit 124 includes a three-input AND gate 125 which is arranged to receive the sampling interval signal (e) from the sampling interval signal generating circuit 123 and the drop-out detection signal (g). An SR flip-flop 126 is arranged to receive the output of the rise detecting circuit 121 as the set input (S), the output of the AND gate 125 as the reset input (R) and the clock signal as the clock input (CK). The SR flip-flop 126 produces the Q output which is connected to the remaining input of the AND gate 125. The output pulses from the AND gate 125 is fed as a sampling pulse (f) to the pedestal sampling circuit 118. The pedestal sampling circuit 118 is made of a D-type flip-flop or the like and latches the pedestal level $V_{PD}$ of the digital video signal in response to the sampling pulse (f). The sampled pedestal level $V_{PD}$ is subtracted from the reference level $V_{RE}$ and the result of the subtraction is averaged in a period of a plurality of horizontal periods ($H_s$) by an operation circuit 127 to obtain the detection output of ($V_{RF}-V_{PD}$) level.

The waveforms in operation of the circuit of FIG. 11 are shown in the waveform diagrams FIGS. 12A to 12G corresponding to the signals (a) to (g) of FIG. 11.

In the pedestal level detecting circuit 13 of FIG. 11, the first gate signal (c) is generated to detect the trailing edge of a horizontal synchronizing signal contained in the synchronizing signal (b). The second gate signal (d) is generated after the passage of a period of time corresponding to the width of the horizontal synchronizing signal (k) on the basis of the detected trailing edge to thereby detect the leading edge of the horizontal synchronizing signal. The sampling interval signal (e) is generated on the basis of the detected leading edge. Accordingly, the horizontal synchronizing signal can be reliably generated and, as a result, the pedestal level can be sampled at the back porch in the horizontal blanking period. Furthermore, since the color burst of the digital video signal (a) has been removed by the LPF 117, it is possible to produce the sampling interval signal (e) having a wide period including the part where the color burst exists.

The sampling pulse (f) is generated in the presence of the sampling interval signal (e) and in the absence of the drop-out detection signal (g). The sampling pulse (f) has a pulse width corresponding to one clock period of the clock signal. Accordingly, if a drop-out is shorter than the sampling interval, one-clock sampling can be made securely in the 1H (one horizontal line period) with no influence of the drop-out as shown by a two-dot chained line in FIG. 12F. Furthermore, since the first and second gate signals (c) and (d) are generated after the drop-out portions have been removed, an erroneous sampling interval signal based on a pseudo horizontal synchronizing signal is never genrated even if such a pseudo horizontal synchronizing signal is generated owing to drop-out.

The output of the pedestal level detecting circuit 13 is added to the video signal by the adder 12 of FIG. 1(B) to thereby clamp the pedestal. The pedestal level $V_{PD}$ is also fed to the signal separating circuit 14 of FIG. 1(B), where the pedestal level $V_{PD}$ is used as a reference level of the separation of the synchronizing signal and the control signal.

In the foregoing arrangement of FIG. 11, the LPF 117 in the input side may be omitted. In the case where the LPF is omitted, the sampling interval signal should be generated for the duration except the color burst part. The construction of the pulse generating control circuit 124 is not limited to the foregoing circuit arrangement but various modifications can be made. For example, a microprocessor may be used. The LPF 117 and the synchronizing separating circuit 119 may be respectively replaced by an LPF 145a and a signal detecting circuit 145c depicted in FIG. 21, which will be described later, to serve for common use.

Figure 13:
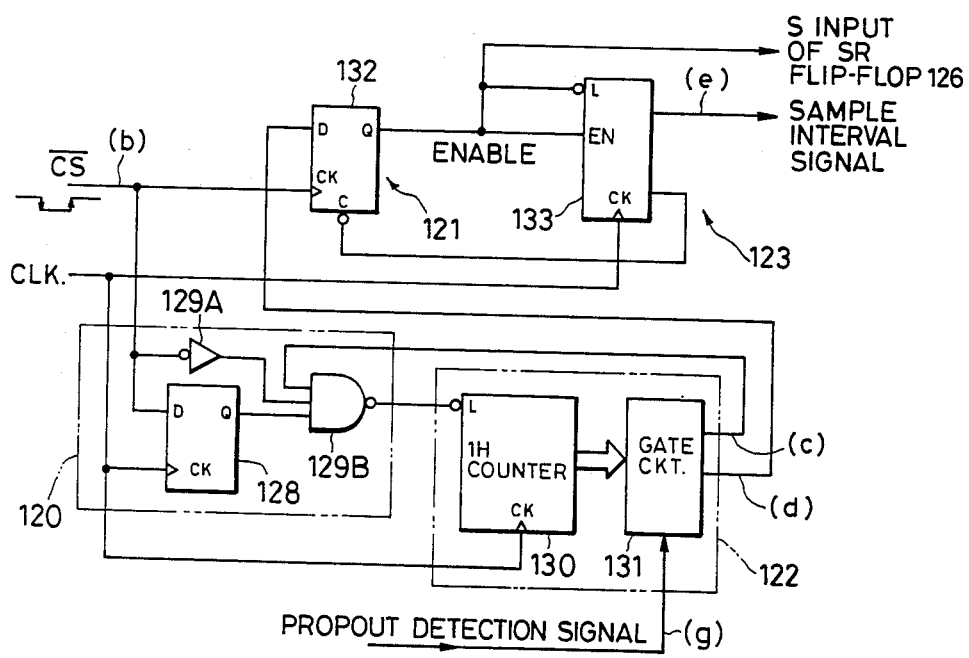
FIG. 13 is a block diagram showing a specific arrangement of the fall detecting circuit, the rise detecting circuit, the timing signal generating circuit and the sampling interval signal generating circuit depicted in FIG. 11.

FIG. 13 shows an example of the specific circuit arrangement for the fail detecting circuit 120, the rise detecting circuit 121, the timing signal generating circuit 122 and the sampling interval signal generating circuit 123 depicted in FIG. 11. In FIG. 13, the fall detecting circuit 120 includes a D-type flip-flop 128 which is arranged to receive the synchronizing signal (b) at its data input (D) and the clock signal at its clock input (CK). An inverter 129A is arranged to receive the synchronizing signal (b) at its input. A three-input NAND gate 129B has three input terminals for respectively receiving the Q output of the flip-flop 128, the first gate signal (c) from the timing signal generating circuit 122 and the output from the inverter 129A. The synchronizing signal (b) is delayed by one clock period in the Q output of the flip-flop 128. When the horizontal synchronizing signal, i.e., the synchronizing signal (b), falls in the period where the first gate signal (c) is at its high level, the level of each of the three input signals of the NAND gate 129B immediately becomes high so that a low-level detection output signal is generated from the NAND gate 129B.

The timing signal generating circuit includes a 1H counter 130 which is arranged to receive the output of the fall detecting circuit at its load input (L) and the clock signal at its clock input. A gate circuit 131 decodes the output of the counter 130 to thereby produce first and second gate signals (c) and (d) in a predetermined period. The 1H counter 130 is provided for counting the clock for a 1H period in synchronism with the trailing edge of the horizontal synchronizing signal. In the case where the video signal is of the NTSC type, the clock frequency is 14.3 MHz=$4f_{sc}$=910 $f_H$ ($f_H$ being the horizontal scanning frequency) and the counter is used as a 910-divider. Furthermore, in the period where drop-out is being generated, the gate signals (c) and (d) are not generated.

Although not shown in the drawing, in the case where discontinuous loading of the 1H counter 130 is performed at a predetermined number of times, the first gate signal (c) is forced to turn to its high level to thereby detect the trailing edge of the horizontal synchronizing signal. This is a technique for preventing the disablement of the pedestal level detection. That is to say, after the 1H counter 130 is loaded owing to equalizing pulses in the state that the phase is shifted by ½H, the loading owing to the synchronizing signal cannot be made to thereby disable the performance of the pedestal level detection, the disablement being prevented from occurring by the foregoing technique.

The rise detecting circuit 121 is constituted by a D-type flip-flop 132 which is arranged to receive the second gate signal (d) of the timing signal generating circuit 122 at its data input (D) and the synchronizing signal (b) at its clock input. When the signal (b) rises in the period where the second gate signal (d) is at its high level, or in other words when the horizontal synchronizing signal rises, the flip-flop 132 produces a high-level detection output at its Q output terminal. The sampling interval signal generating circuit 123 is constituted by a 7-bit counter 133 which is arranged to receive the output of the rise detecting circuit 121 at its load input (L) as well as at its enable input (EN). The counter 133 is loaded with "90" just before the leading edge of the horizontal synchronizing signal. After the leading edge of the horizontal synchronizing signal, the counter 133 starts counting and produces a sampling interval signal (e) in a sampling period, that is, the period of from "96" to "127". When the count is over "127" and turns to "0", the counter 133 clears the D-type flip-flop 132 so as to make its load input and it enable input be at their low level, and returns to its loading state and stops.

The rise detecting circuit 120 and the timing signal generating circuit 122 may form an HV separating circuit 145d which will be described later with reference to FIG. 21. They may also form a part of a timing signal generating portion of a system controller 18 depicted in FIG. 31 which will be also described later. A part of the HV separating circuit 145d, for detecting the trailing edge of the horizontal synchronizing signal, and a D-type flip-flop 180, an inverter 181A and an NAND gate 181B depicted in FIG. 31, may be replaced by the fall detecting circuit 120. Furthermore, the 1H counter 130 and the gate circuit 131 may serve respectively as a 1H counter 183 and a gate circuit 182A depicted in FIG. 31.

Figure 14:
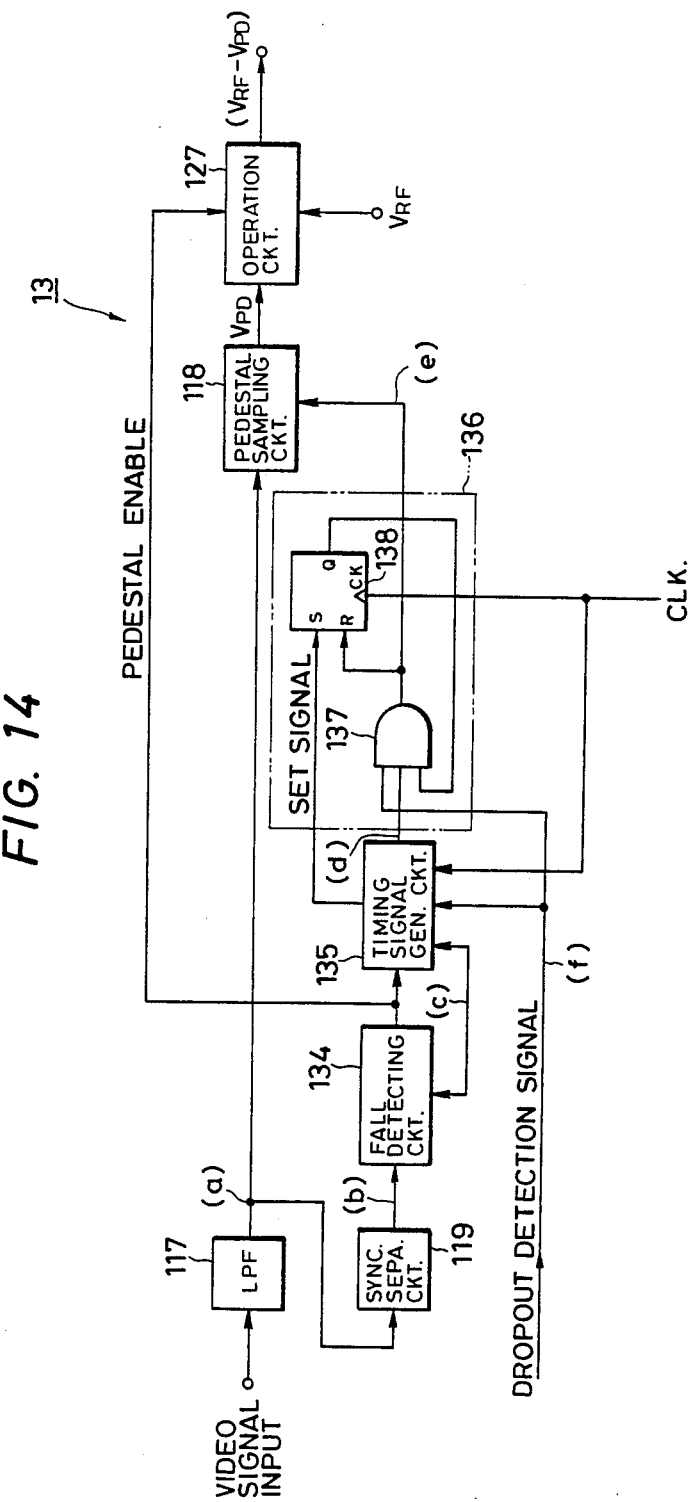
FIG. 14 is a block diagram showing another example of the arrangement of the pedestal level detecting circuit.

FIG. 14 is a block diagram showing another arrangement of the pedestal level detecting circuit 13. In the drawing, like parts in each of FIGS. 11 and 14 are correspondingly referenced. In FIG. 14, the synchronizing signal (b) separated from the digital video signal (a) passed through the LPF 117 by the synchronizing separating circuit 119 is fed to a fall detecting circuit 134. The fall detecting circuit 134 detects the trailing edge of the synchronizing signal (b) in the presence of a gate signal (c) generated from a timing signal generating circuit 135 and feeds its detection output to the timing signal generating circuit 135.

The timing signal generating circuit 135 produces a gate signal (c) on the basis of the clock signal in the absence of the drop-out detection signal (f) and further produces a sampling interval signal (d) at the front porch of the horizontal synchronizing signal after a period of 1H on the basis of the trailing detection timing from the fall detecting 134 to thereby feed the signal (d) to a pulse generating control circuit 136.

For example, the pulse generating control circuit 136 is constituted by a three-input AND gate 137, which receives the sampling interval signal (d) from the timing signal generating circuit 135 and the drop-out detection signal (f), and an SR flip-flop 138 which receives the set signal from the timing signal generating circuit 135 at its set input (S) and the output of the AND gate 137 at its reset input (R). The SR flip-flop 138 feeds its Q output to one input terminal of the AND gate 137. The pulse generating control circuit 136 feeds the output pulse of the AND gate 137 as a sampling pulse (e) to the pedestal sampling circuit 118. Other operations are carried out in the same manner as shown in FIG. 11.

FIG. 15 shows waveforms in operation of the circuit of FIG. 14. The waveforms of FIGS. 15A to 15F respectively correspond to the signals (a) to (f) of FIG. 14.

In the pedestal level detecting circuit 13 of FIG. 14, the trailing edge of the horizontal synchronizing signal is detected based on the gate signal (c). The set signal if generated on the basis of the detected trailing edge to thereby open the AND gate 137. Thereafter, the sampling interval signal (d) is generated corresponding to the front porch after the period 1H. Accordingly, the pedestal level is enabled to be detected even in the vertical blanking period. In the case where the trailing edge of the horizontal synchronizing signal cannot be detected in the presence of the gate signal (c) after the pedestal level has been detected, a pedestal-enable signal is generated from the fall detecting circuit 134 to thereby inform the next circuit that the sampled pedestal level is invalid or that the previously detected pedestal level should be held. For example, the pedestal-enable signal is fed to the operation circuit 127 to thereby make the circuit 127 continuously produce the previous value ($V_{RF} - V_{PD}$).

Because of the gate signal (c) and the sampling interval signal (d) are generated except for the part where drop-out occurred and because the sampling pulse (e) in only one clock period is generated in the pulse generating control circuit 136, there is no erroneous generation of the sampling interval signal (d) owing to drop-out. Accordingly, unless the length of drop-out exceeds the sampling interval, a single clock sampling for 1H can be reliably performed with no influence of drop-out as shown by the two-dot chained line in the diagram of FIG. 15E.

FIG. 16 shows an example of a specific arrangement of the fall detecting circuit 134 and the timing signal generating circuit 135 of FIG. 14. In FIG. 16, the fall detecting circuit 134 is constituted by a JK flip-flop 139 which is arrange to receive the synchronizing signal (b) at its inverted clock input and the gate signal (c) at its J input. When the synchronizing signal (b) falls while the gate signal (c) is at its high level, or in other words when the horizontal synchronizing signal falls, the Q output turns to its high level and is kept at the high level till the reset signal turns to its low level. When the reset signal turns to its low level, the Q output turns to its low level.

The timing signal generating circuit 135 includes a D-type flip-flop 140 which receives the Q output of the JK flip-flop 139 as its data input (D) and the clock signal at its clock input. A D-type flip-flop 141 receives the Q output of the flip-flop 140 at its D input and the clock signal at its clock input. A 1H counter 142 receives the Q output of the flip-flop 141 at its load input (L) and the clock signal at its clock input. Finally, a gate circuit 143 decodes the output of the 1H counter 142 to thereby produce a gate signal and a reset signal in a predetermined period. Immediately after the Q output of the JK flip-flop 139 has turned to its high level, a load pulse of one clock period is generated from each of the D-type flip-flops 140 and 141 to thereby load the 1H counter 142. Accordingly, the 1H counter 142 which counts a 1H period is synchronism with the trailing edge of the horizontal synchronizing signal becomes a 910-divider in the case where the video signal is of an NTSC type, becuse the clock frequency for the 1H counter 142 is 4.3 MHz=$4f_{sc}$=910 $f_H$ ($f_H$ being the horizontal scanning frequency). In the gate circuit 143, the gate signal (c) is not generated in the presence of drop-out. Furthermore, the reset signal is generated as a pulse at the rate of once per 1H period while being kept at a sufficient interval from the gate signal (c) so that the pedestal-enable signal can be recognized by the circuit in the next stage.

To prevent the ½H shifting of the gate signal (c) caused by the loading of the 1H counter owing to equalizing pulses, the same technique as in FIG. 13 is applied to the circuit of FIG. 16.

Figure 21:
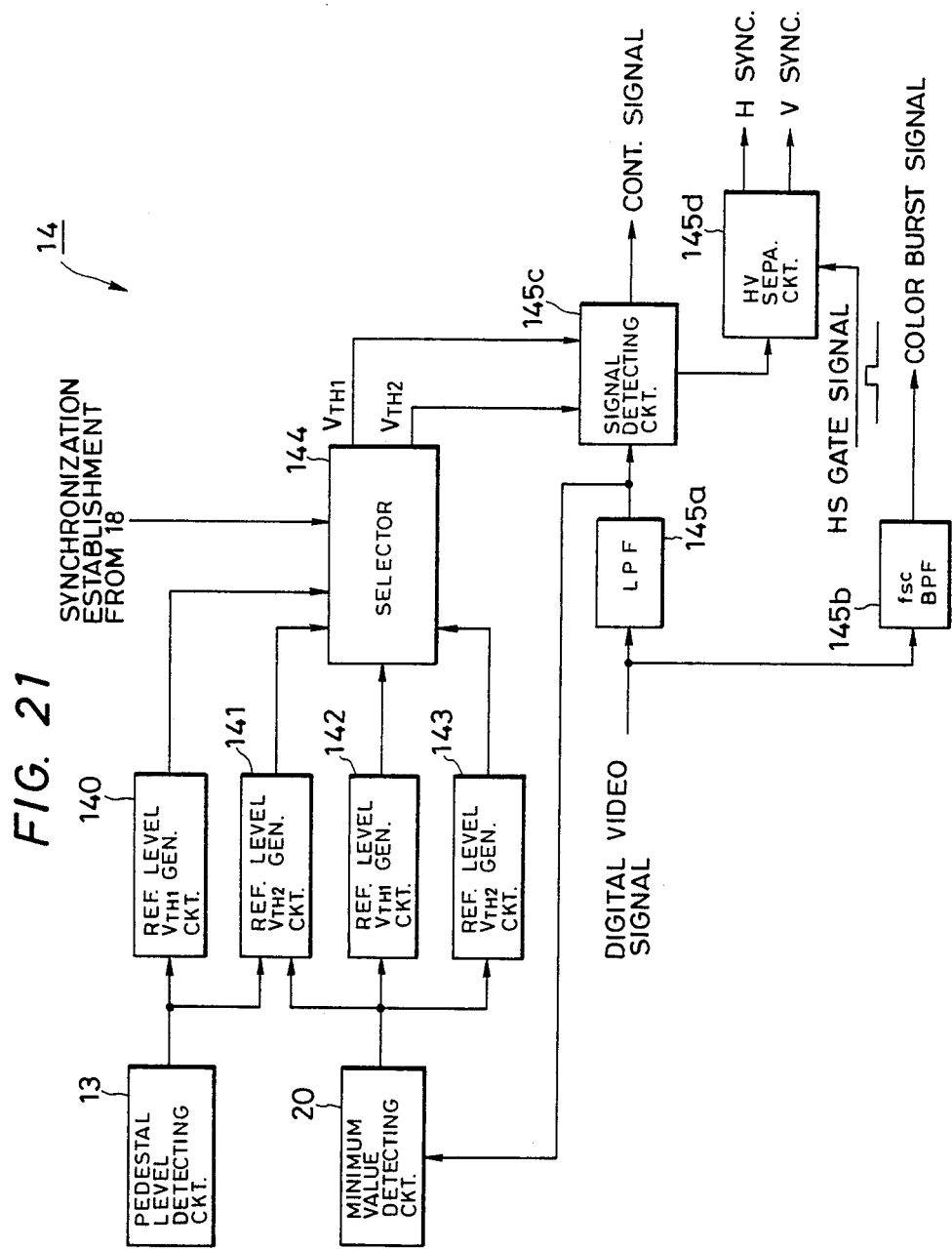
FIG. 21 is a block diagram showing a specific arrangement of the signal separating circuit.
Figure 31:
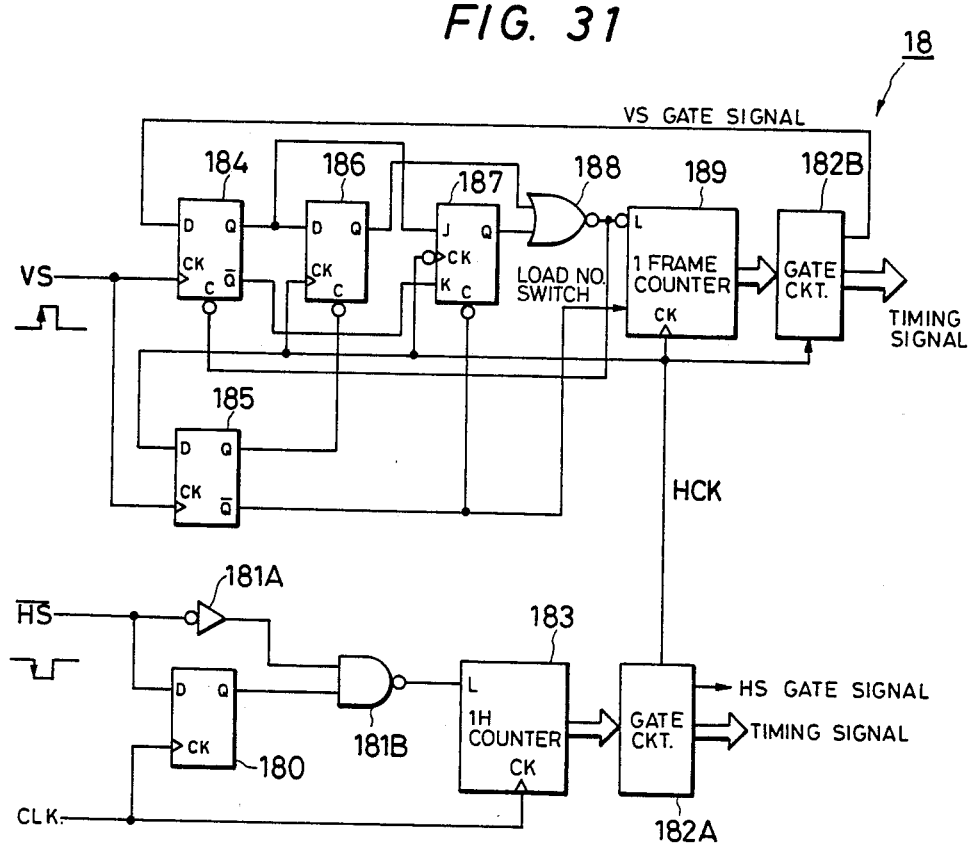
FIG. 31 is a block diagram showing the arrangement of a portion of hardware used for a predetermined function of the system controller depicted in FIG. 1B.

Furthermore, the interchange or common use between the circuit of FIG. 16 and other circuits, such as the HV separating circuit 145d of FIG. 21 and the circuit of FIG. 31, is possible in the same manner as was the case of FIG. 13.

Next, the drop-out correcting circuit 19 in FIG. 1B will be described hereunder. The drop-out correcting circuit 19 is arranged to correct drop-outs occurring in the digital video signal fed from the adder 12. With respect to the drop-out in the vertical synchronizing signal portion, the drop-out is corrected by replacement by a correction signal previously set to a level equal to the signal level of the vertical synchronizing signal.

Figure 17:
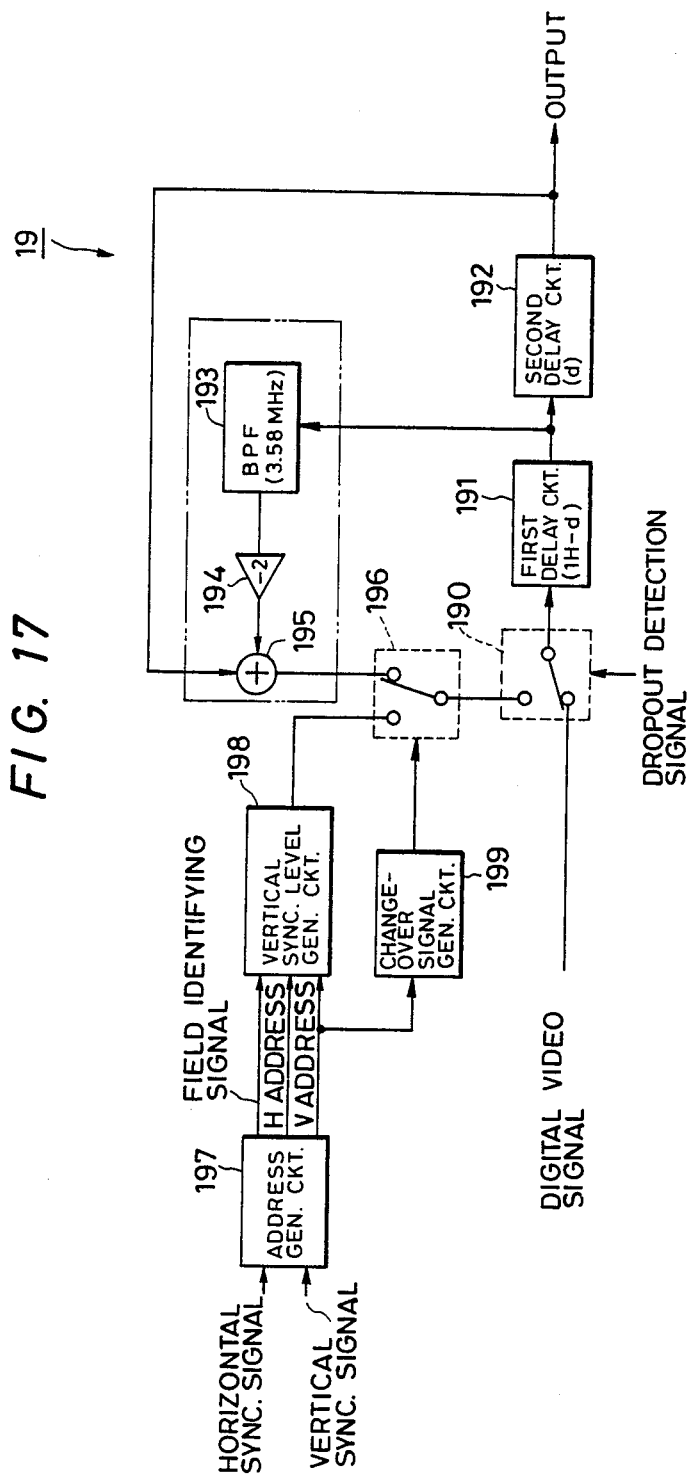
FIG. 17 is a block diagram showing a specific arrangement of the drop-out correcting circuit depicted in FIG. 1B.

The arrangement of the drop-out correcting circuit 19 is shown in FIG. 17. In the drawing, the digital video signal is fed to one input terminal of a first change-over switch 190, and the output of the switch 190 is fed through a first delay circuit 191 to both a second delay circuit 192 and a BPF 193 of 3.58 MHz. If the delay quantity of the BPF 193 is represented by d, the delay quantity of the first delay circuit 191 is set to (1H−d) and the delay quantity of the second delay circuit 192 is set to d. The output of the BPF 193 is fed to an adder 195 through a multiplier 194 having a multiplication factor of (−2). The effect is to subtract twice the output of the BPF 193 from the output of the second delay circuit 192. The output of the adder 195 is fed to one input terminal of a second change-over switch 196, and the output of the switch 196 is fed to the other input terminal of the first change-over switch 190. The first change-over switch 190 is controlled by the drop-out detection signal fed from the drop-out detecting circuit 17 (FIG. 1A).

An address generating circuit 197 is arranged to produce a field identifying signal, a horizontal address and a vertical address on the basis of the horizontal and vertical synchronizing signals fed from the signal separating circuit 14. On the basis of this address information, a vertical synchronizing level generating circuit 198 produces a correction signal preset to a level equal to a known signal level of the vertical synchronizing signal. The correction signal is fed to the other input of the second change-over switch 196. A change-over signal generating circuit 199 is arranged to produce a vertical synchronizing interval signal in the presence of the vertical synchronizing signal on the basis of the vertical address. The vertical synchronizing interval signal is used as a change-over signal for controlling the second change-over switch 196.

As shown in FIG. 18A, in the case where drop-out occurs at a vertical synchronizing pulse part of the signal of FIG. 18A before correction, if the drop-out part is replaced by the corresponding part of the signal of FIG. 18B of the time 1H before to thereby correct the drop-out, then the shifting of the vertical synchronizing pulse often occurs in the corrected signal of FIG. 18C because of the lack of horizontal correlation. In FIG. 18C, the position marked by a white circle is shifted by the period of ½H compared with the corresponding positions in both FIGS. 18A and 18B. The shifting of the vertical synchronizing pulse may produce a field error in the succeeding video equipment. If the drop-out correction of the vertical synchronizing pulse is inhibited, on the contrary, there is the possibility of causing disorder in synchronization.

To solve the problems, a technique as shown in FIG. 17 is used. That is to say, in the case where drop-out occurs in the vertical synchronizing pulse portion, a correction signal of a level equal to the signal level of the vertical synchronizing signal generated from the vertical synchronizing level generating circuit 198 at the time 1H before is fed to the first change-over switch 190 to be substituted for the present digital video signal to thereby perform drop-out correction without causing the shifting of the vertical synchronizing pulse.

In FIG. 17, the drop-out is corrected by using the signal of 1H before, but the phase of the chrominance signal becomes reversed. In order to change the reversed phase to the normal one, a circuit as enclosed by a broken line in FIG. 17 is provided. The phase of the chrominance signal is inverted by the circuit to thereby make it possible to use the drop-out correction signal as a color signal. Accordingly, in the case where the drop-out correction is applied only to the luminance signal (monochrome) or in the case where the correction is applied to the signal of 2H before (clock signal being in phase), it is a matter of course that the circuit surrounded by the broken line is removed. The address generating circuit 197, the vertical synchronizing level generating circuit 198 and the change-over signal generating circuit may be included in the system controller 18 or may be replaced, as depicted in FIG. 31, by a 1H counter 182B, and so on.

Figure 19A:
FIGS. 19A-19D are a series of waveform diagrams for explaining the operation of the drop-out detecting circuit depicted in FIG. 1A.

The drop-out detecting circuit 17 of FIG. 1A is arranged in the form of a level comparator so as to detect the fact that the signal level of the output signal of the square sum circuit 72 in the FM detecting circuit 7 drops below a predetermined value. That is, the signal level of the square signal of FIG. 19B of the envelope component of the digital FM video signal of FIG. 19A drops below the predetermined value to thereby produce a drop-out detection signal of FIG. 19C. Accordingly, because the drop-out detecting circuit can be made up of a level comparator in addition to the FM detecting circuit 7, the detection of drop-out can be surely realized by a simple circuit arrangement. Furthermore, because the detecting operation is carried out digitally, stable characteristics can be obtained.

Figure 19B:
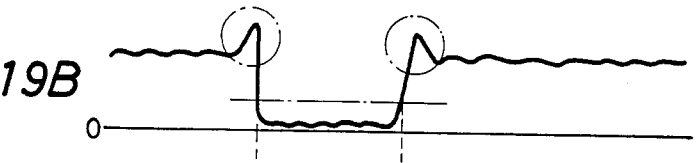
Figure 19C:
Figure 19D:
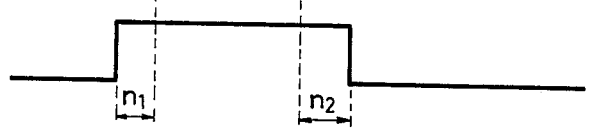

The ringing (the portion surrounded by a one-dot chained line as shown in FIG. 19B) produced in the output of the square sum circuit 72 by the sudden change of the envelope component may cause malfunction in the detecting output. However, when a drop-out detection signal of FIG. 19D expressed a drop-out length including both the length $n_1$ and the length $n_2$ at its ends is produced, the succeeding correction can be reliably carried out. In the above description, $n_1$ represents a length corresponding to the ringing produced before the signal level of the output signal of FIG. 19B of the square sum circuit 72 becomes less than the predetermined value and $n_2$ represents a length corresponding to the ringing produced after the signal level becomes above the predetermined vale. Because there is still a possibility of ringing occurring corresponding to the delay time of the Hilbert transformer 70, each of the lengths $n_1$ and $n_2$ should be set to be not smaller than the delay time n·D of the delay circuit 71.

Figure 20:
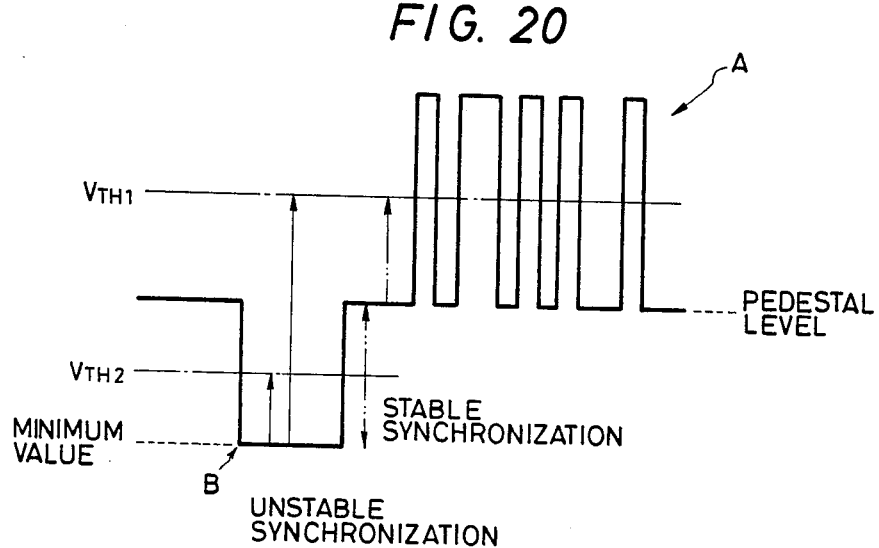
FIG. 20 is a waveform diagram showing the relation between the video signal and the reference level in the signal separating circuit depicted in FIG. 1B.

In the signal separating circuit 14 of FIG. 1B, as shown in FIG. 20, a control signal A for the frame number, the stop code, and so on, as well as the color burst signal, the horizontal synchronizing signal and the vertical synchronizing signal, are separated from the digital video signal. For the signal separation, a first reference level $V_{TH1}$ is set to separate the control signal A and a second reference level $V_{TH2}$ is set to separate the synchronizing signal B.

The arrangement of the signal separating circuit 14 is shown in FIG. 21. In the drawing, the pedestal level of the digital video signal is detected by the pedestal level detecting circuit 13 as described above, and the minimum level of the digital video signal within a predetermined range is detected by a minimum value detecting circuit 20. The arrangement of the minimum value detecting circuit 20 will be described later in detail. The first reference level $V_{TH1}$ and the second reference level $V_{TH2}$ are determined on the basis of the detection level in each of the pedestal level detecting circuit 13 and the minimum value detecting circuit 20. That is to say, the reference level generating circuit 140 produces a first reference level $V_{TH1}$ by adding a predetermined value to the detection level of the pedestal level detecting circuit 13 only on the basis of the detection level, and the reference level generating circuit 141 produces a second reference level $V_{TH2}$ by averaging the two levels respectively detected by the pedestal level detecting circuit 13 and the minimum value detecting circuit 20. On the other hand, the reference level generating circuits 142 and 143 of FIG. 21 produce first and second reference levels $V_{TH1}$ and $V_{TH2}$ only on the basis of the detection level of the minimum value detecting circuit 20.

The output from each of the reference level generating circuits 140-143 is fed to a selector 144. When a synchronizing-valid signal is fed from the system controller 18, or in other words when the synchronization is stable, the selector 144 selects the first and second reference levels $V_{TH1}$ and $V_{TH2}$ generated by the respective reference level generating circuits 140 and 141. Otherwise, when the synchronization is unstable, the selector 144 selects the other first and second reference levels $V_{TH1}$ and $V_{TH2}$ generated by the respective reference level generating circuits 142 and 143. The system controller 18 judges whether or not synchronization is established through the comparison between the reference synchronizing pulse based on the internal clock and the extracted synchronizing pulse. The first and second reference levels $V_{TH1}$ and $V_{TH2}$ selected by the selector 144 are fed to a signal detecting circuit 145c which separates the control signal A and the synchronizing signal B from the digital video signal passed through an LPF 145a. The separation is performed on the basis of the reference levels $V_{TH1}$ and $V_{TH2}$.

In short, in the signal separating circuit 14 having such an arrangement as described above, the separation/extraction of the control signal A and the synchronizing signal B is carried out when 1H synchronization is stable on the basis of the first and second reference levels $V_{TH1}$ and $V_{TH2}$ set respectively on the basis of the pedestal level and on the basis of both the pedestal level and the minimum level. When synchronization is unstable, on the contrary, for example, in the rising of revolution of the spindle motor 24 or in the searching or scanning of the CLV disc, the separation/extraction of the control signal A and the synchronizing signal B is carried out on the basis of the first and second reference levels $V_{TH1}$ and $V_{TH2}$ set on the basis of only the minimum level because the pedestal detection position cannot be determined and therefore the pedestal level cannot be determined. Accordingly, not only in the case of stable synchronization but also even in the case of unstable synchronization, signal separation can be carried out of unstable synchronization, signal separation can be carried out stably and securely. The synchronizing signal B thus separated is fed to an HV separating circuit 145d which separates a horizontal synchronizing signal by detecting the trailing edge when an HS gate signal fed from the system controller 18 is at its high level. Furthermore, the synchronizing signal B is integrated in the HV separating circuit 145d which separates a vertical synchronizing signal on the basis of a predetermined reference level. The digital video signal is fed to an $f_{sc}$-BPF 145b as well as the LPF 145a. Thereafter, a color burst signal including a color signal component is produced from the $f_{sc}$-BPF 145b.

Figure 22:
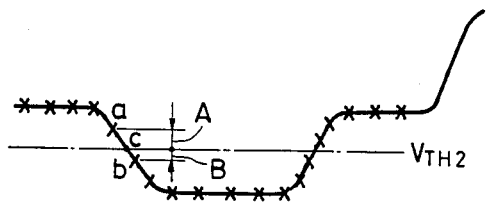
FIG. 22 is a waveform diagram for explaining the operation of the signal detecting circuit depicted in FIG. 21.
Figure 23:
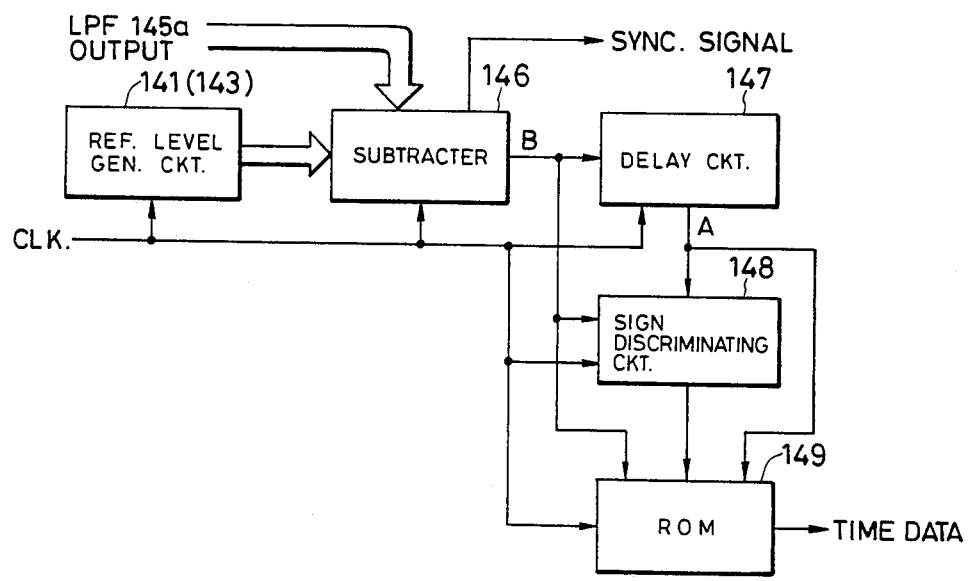
FIG. 23 is a block diagram showing a specific arrangement of the signal detecting circuit.

With respect to the detection of synchronizing signal in the signal detecting circuit 145c, as shown in FIG. 22, the digital video signal is sampled at every predetermined clock (the mark x indicates a sampling point) to thereby detect the synchronizing signal at the point in time when its signal level exceed the reference level $V_{TH2}$. The arrangement of the synchronizing signal detecting circuit is shown in FIG. 23. In the drawing, a subtracter 146 receives both the reference level $V_{TH2}$ from the reference level generating circuit 141 (or 143) and the digital video signal having passed through the LPF 145a. The subtracter 146 calculates the level difference between the reference level $V_{TH2}$ and the video signal level at every sampling point and detects the sampling point as a synchronizing signal only when the video signal level is lower than the reference level $V_{TH2}$. The level difference signal thus calculated by the subtracter 146 is fed to each of a delay circuit 147, a sign discriminating circuit 148 and a storage device 149, such as ROM (read only memory) or the like. The level difference signal from the subtracter 146 is delayed by one clock period by the delay circuit 147 having a delay quantity corresponding to one clock period and is then fed to both the sign discriminating circuit 148 and the storage 149. The sign discriminating circuit 148 judges where the level difference is that in the state where the output A of the delay circuit 147 is positive and the output B of the subtracter 146 is negative. In other words, it judges whether the level difference is that at the sampling point a just before the output A delay circuit 147 reaches the reference level $V_{TH2}$ and, at the same time, at the sampling point b just after the output b of the subtracter 146 has reached the reference level $V_{TH2}$. On the basis of the judgment, the sign discriminating circuit 148 feeds a discrimination signal to the storage device 149.

Figures 24, 25:
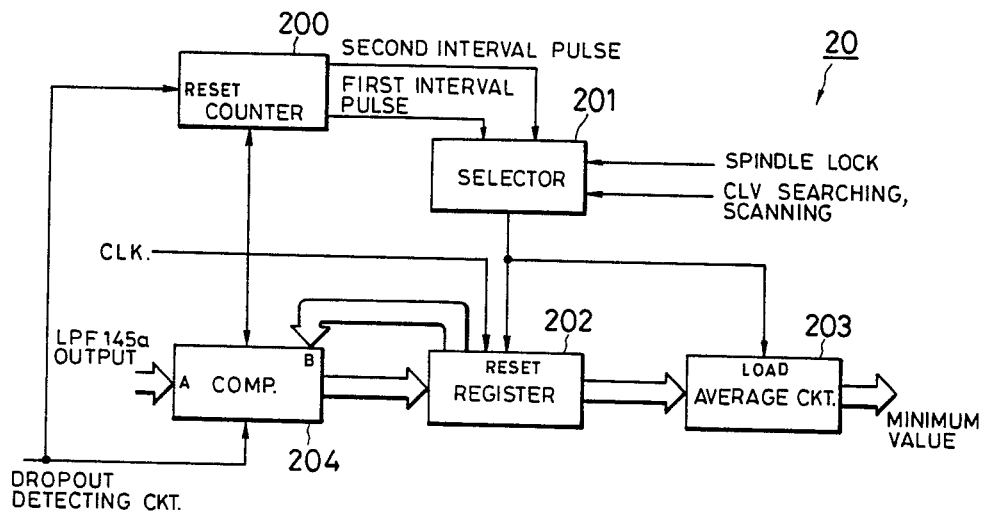
FIG. 24 is a drawing showing an example of the time table stored in the ROM depicted in FIG. 23.
FIG. 25 is a block diagram showing a specific arrangement of the minimum value detecting circuit depicted in FIG. 21.

The storage device 149 in which a time table as shown in FIG. 24 has been stored in advance, produces a time data corresponding to each of the respective outputs of the delay circuit 147 and the subtracter 146 at the point in time when the discrimination signal is generated from the sign discriminating circuit. In other words, it produces a time data corresponding to the level difference values A and B at the sampling points a and b.

Each of the inputs A and B and the output of the storage device 149 is composed of 4 bits. The first one of the four bits in each of the inputs a and B is a sign bit expressed in two's complement notation. The time information, which is the output of the storage device 149, is a time difference between the point in time c when the signal level of the synchronizing signal reaches the reference level $V_{TH2}$ and the sampling point a or c. Accordingly, even if the point in time c does not agree with the sampling point in time, the position of the trailing edge of the synchronizing signal can be exactly detected.

The minimum value detecting circuit 20 of FIG. 21 will be described hereunder. In FIG. 25, the counter 200 counts the clock to thereby produce a first interval pulse at every interval corresponding to 1H and a second interval pulse at every interval greater than the interval corresponding to 1H. These interval pulses are fed to a selector 201 which is arranged to select the first interval pulse in the case of the steady state or the second interval pulse in the case of the unsteady state where the revolution of the disk is unstable, for example, in the rising in revolution of the spindle motor 24 or in CLV searching or scanning. The interval pulse thus selected is fed to both a register 202 and an averaging circuit 203. A comparator 204 which is arranged to receive the digital video signal from the LPF 145a compares the input data A with the data B stored in the register 202 whenever a clock pulse is generated, so as to feed a smaller one of the data A and B to the register 202. Upon occurrence of drop-out, however, the comparator 204 stops its operation. The register 202 is reset by the first or second interval pulse fed to it from the selector 201 so that the register 202 stores the minimum value in the period from the last reset point. The minimum value stored in the register 202 is loaded to an averaging circuit 203 whenever the first or second interval pulse is generated. The averaging circuit 203 averages the minimum values for two or more detecting periods to thereby produce the average as the final minimum value.

In the foregoing arrangement, the minimum value with respect to the video signal generally appears during the synchronizing signal period so that the length of 1H period may vary in the case of the unsteady state, for example, in the rising in revolution of the spindle motor 24 or in CLV searching or scanning, or the like, because the rotation of the disk is unstable in such a unsteady state although the detecting period (the interval of occurrence of the first interval pulse) is set to the 1H period. If the detection of the minimum value is carried out at every normal period corresponding to the first interval pulse, the synchronizing signal is often out of the period. Therefore, the second interval pulse generated at every period longer than the period corresponding to the 1H period is used so that the synchronizing signal comes within the detecting period. Accordingly, the minimum level can be securely detected and its change can be suppressed. Although a value smaller than the level of the synchronizing signal may often temporarily appears in the presence of drop-out, erroneous minimum value detection can be prevented by a technique of stopping the operation of the comparator 204 in the drop-out length to interrupt the detecting operation.

Furthermore, because the counter 200 is reset by the drop-out detection signal and restarts counting for a predetermined period of time after the drop-out, the level of the synchronizing signal portion can be securely detected till the generation of the next interval pulse even if the synchronizing signal portion is missed owing to the drop-out.

Figure 26:
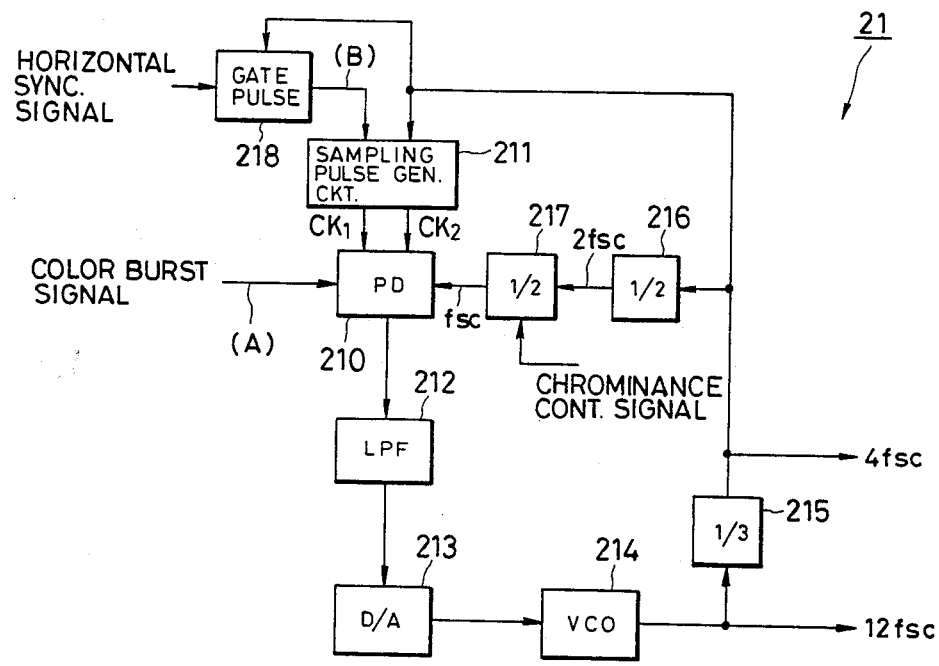
FIG. 26 is a block diagram showing a specific arrangement of the clock generating circuit depicted in FIG. 1B.

The clock generating circuit 21 of FIG. 1B is arranged, a shown in FIG. 26, in the form of a PLL (phase-locked loop) and produces two kinds of clocks of frequencies $4f_{sc}$ and $4Nf_{sc}$ (for example, $12f_{sc}$, where $f_{sc}$ is the subcarrier frequency), on the basis of the reference horizontal synchronizing signal from the reference signal generating circuit 22 or the horizontal synchronizing signal or color burst signal from the signal separating circuit 14. The thus generated $4f_{sc}$ and $4Nf_{sc}$ clocks are used as the clock for digital processing. The sampling clock for the A/D converter 4 and the clock for the signal processing till the video LPF 10 are set at $4Nf_{sc}$, and the clock after the output of the video LPF 10 is sampled down to $4f_{sc}$. In FIG. 26, a phase comparator 210 receives the color burst signal as a reference input, performs phase comparison in response to sampling pulses $CK_1$ and $CK_2$ fed via a sampling pulse generating circuit 211. In the case where the PLL is made to be locked with the reference horizontal synchronizing signal or the horizontal synchronizing signal, the phase comparator 210 is not used but another phase comparator (not shown) is used to perform phase comparison between, on one hand, one of the reference horizontal synchronizing signal or the horizontal synchronizing signal and, on the other hand, a signal of $f_H$, which frequency is 1/455-th of $2f_{sc}$. The resultant output is fed to an LPF 21.

Figure 27A:
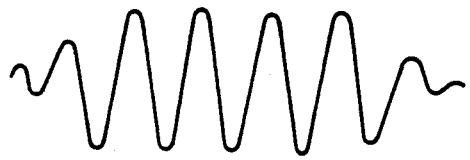
FIGS. 27A-27B are a series of waveform diagrams of the parts depicted in FIG. 26.
Figure 27B:
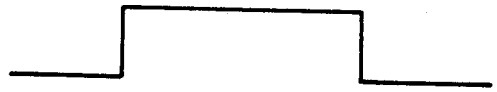

The case where the PLL is locked with the color burst signal will be described hereunder. The output of the phase comparator 210 is fed to a D/A converter 213 through the LPF 212 and converter into an analog signal for controlling a VCO (voltage-control oscillator) 214. The frequency of the VCO 214 is set to $12f_{sc}$. Not only the frequency of $12f_{sc}$ is produced as it is as a clock of $12f_{sc}$ but also the frequency of $12f_{sc}$ is divided into $4f_{sc}$ by a ⅓ frequency divider 215. The clock of $4f_{sc}$ is produced as it is and fed to one input terminal of the sampling pulse generating circuit 211. The $f_{sc}$ clock is further divided into $f_{sc}$ through two ½ frequency dividers 216 and 217, the $f_{sc}$ clock signal being fed to the phase comparator 210 as a comparison input. A gate pulse generated from a gate pulse generating circuit 218 is fed to the other input terminal of the sampling pulse generating circuit 218. Accordingly, the phase comparator 210 is supplied with the sampling pulses $CK_1$ and $CK_2$ only in the presence of the gate pulse. The gate pulse generating circuit 218 is synchronized with $4f_{sc}$ on the basis of the horizontal synchronizing signal, and generates the gate pulse of FIG. 27B for a time corresponding to the regular amplitude center part of the color burst signal of FIG. 27A.

Figure 28:
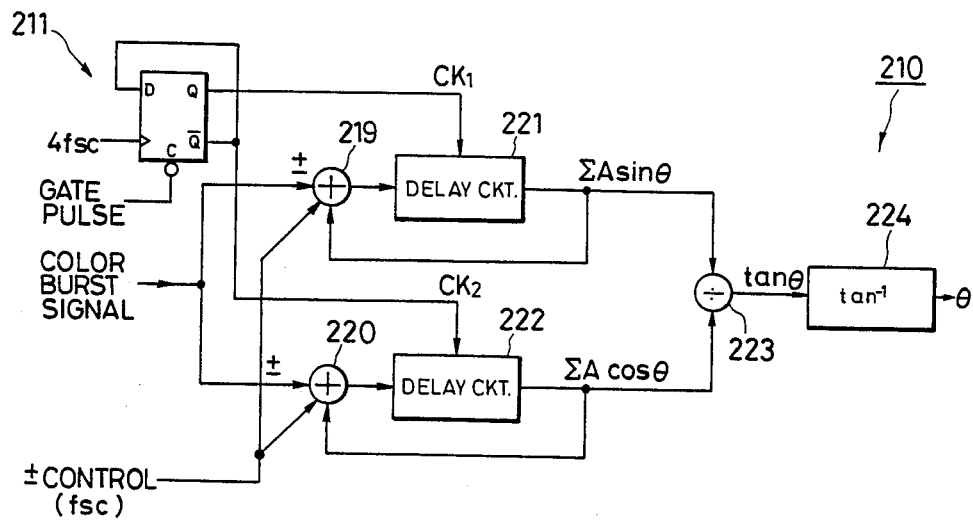
FIG. 28 is a block diagram showing a specific arrangement of the phase comparator depicted in FIG. 26.

In the phase comparator 210, as shown in FIG. 28, the color burst signal is fed to one input of each of adder/subtracters 219 and 220. The respective output signals of the adder/subtracters are passed through delay circuits 221 and 222 so as to be fed to the respective other inputs of the adder-subtracters 219 and 220 as well as to a divider 223 to be divided therein. The operations of the adder-subtracters 219 and 220 are controlled on the basis of the clock pulse of $f_{sc}$, as shown in FIG. 29B, so that addition is selected at the sampling points $S_1$ and $S_2$ while subtraction is selected at the sampling points $S_3$ and $S_4$. However, when track jumping is made in still picture reproduction or the like, the phase of the color burst signal is changed by 180°. Therefore, to maintain the lock of the PLL, the phase of the $1-f_{sc}$ clock pulse of FIG. 29B should be inverted at every track jumping. The phase inverting operation is performed by controlling the ½ frequency divider 217 through a chrominance-inverting control signal fed from the system controller 18 of FIG. 1B.

The sampling pulse generating circuit 211 is constituted by a D-type flip-flop such that the sampling clocks $CK_1$ and $CK_2$ are synchronized with $4f_{sc}$, are reversed in phase with each other at the mid portion thereof, and are used as clocks for the respective delay circuits 221 and 222 only when the gate pulse is at its high level. As the results, the sum of $A \sin \theta$ and the sum of $A \cos \theta$ are derived as the respective outputs of the delay circuits 221 and 222. Also, $\tan \theta$ is derived as the output of the divider 223. Here, A represents the amplitude of the color burst signal of FIG. 29A. The division output, $\tan \theta$ passes through a $\tan^{-1}$ circuit 224 so that the phase difference $\theta$ is ultimately obtained.

In short, the phase difference $\theta$ in the phase comparator 210 is calculated by the equation $$\theta = \tan^{-1} \{\Sigma[(S_1-S_3)/(S_2-S_4)]\}$$

where $S_1 = A \cdot \sin \theta$, $S_2 = A \cdot \cos \theta$, $S_3 = -A \cdot \sin \theta$, and $S_4 = -A \cdot \cos \theta$.

Figure 29A:
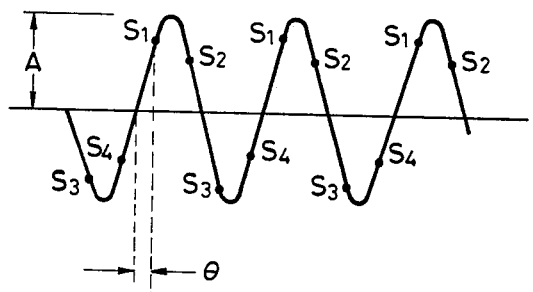
FIGS. 29A-29B are a series of waveform diagram for explaining the operation of the circuit of FIG. 28.
Figure 29B:

It is apparent from the equation that, if the amplitude A of the color burst signal of FIG. 29A is not constant within 1H, a little error appears on the detected phase difference or a change in loop characteristic appears owing to a change in loop gain of the PLL.

However, in the above-described clock generating circuit 21, the sampling pulses $CK_1$ and $CK_2$ for the calculation of $S_1$ to $S_4$ is gated so that phase comparison can be made only in the period during which the amplitude A of the color burst signal of FIG. 29A is kept constant. Accordingly, such problems never occur.

Although the foregoing embodiment shows the case where the sampling pulses are gated to thereby perform phase comparison only at the center part of the color burst signal, it is a matter of course that the invention is applicable to the case where the color burst signal is directly gated. In this case, the center part of the color burst signal can be exactly drawn out by comparison with an analog switch or the like because of the digital gating. In FIG. 26, the LPF 21 and the D/A converter 213 may be exchanged by each other in position.

In FIG. 1B, the reference signal generator 22 constituted by a quartz oscillator, or the like, produces a reference signal and a reference horizontal synchronizing signal each of frequency $4f_{sc}$. The spindle servo circuit 23 controls the driving of the spindle motor 24 in accordance with the phase difference between the reference horizontal synchronizing signal from the reference signal generator 22 and the horizontal synchronizing signal from the signal separating circuit 14. The chrominance inverting circuit 25 inverts the phase of the chrominance (color) signal as occasion demands to maintain color framing at the time of special reproduction such as "still", "slow" or the like.

Figure 30:
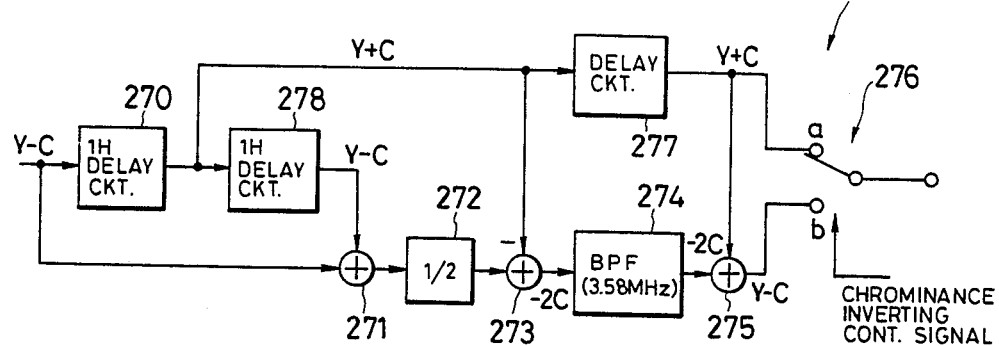
FIG. 30 is a block diagram showing a specific arrangement of the chrominance inverting circuit depicted in FIG. 1B.

The arrangement of the chrominance inverting circuit 25 is shown in FIG. 30. In the drawing, the digital video signal is fed to both a delay circuit 270 and an adder 271. The output of the adder 271 is fed to a subtracter 273 after its signal level is reduced to half by a level adjusting circuit 262. The output of the subtracter 273 is fed to an adder 275 through a phase-linear acyclic digital BPF 274. The output of the adder 275 is fed to a change-over switch 276.

The output of the delay circuit 270 is fed to both the adder 273 and parallel delay circuit 277 having the same delay quantity as the BPF 274. On the other hand, the output of the first delay circuit 270 is fed to the adder 261 via another 1H delay circuit 278. The output of the parallel delay circuit 277 is fed to both the adder 275 and the change-over switch 276. The change-over switch 276 is suitably changed over by the chrominance-inverting control signal supplied from the system controller 18 of FIG. 1B. Thus, a three-line-correlative comb filter is made up so that the delayed output of the subtracter 273 becomes a chrominance signal ($-2C$) with reversed phase and double level with respect to the delayed output ($Y+C$) of the first 1H delay circuit 270. After any unnecessary component has been removed from the chrominance signal by the BPF 274, the chrominance signal is added to the delayed output ($Y+C$) of the parallel delay circuit 277 by the adder 275 to thereby obtain, at the output of the adder 275, a digital video signal (b) including a chrominance signal with reversed phase relative to the delayed output (a) of the delay circuit 277. Accordingly, the change-over switch 276 is controlled by the chrominance inverting control signal from the system controller 18 to thereby make it possible to maintain color framing at the time of special reproduction such as "still", "slow", etc.

In FIG. 1B, the output of the chrominance inverting circuit 25 is fed to a video processing circuit 38. The video processing circuit 38 carries out video processing such as character insertion, MCA code suppression, squelch, and the like. The digital video signal having passed through the video processing circuit 38 is written into a buffer memory 39 by the $4f_{sc}$ clock generated from the clock generating circuit 21 on the basis of the color burst signal sampled from the reproduced video signal. Reading from the buffer memory 39 is carried out by the $4f_{sc}$ reference clock generated from the reference signal generator 22. Because the digital video signal is read from the buffer memory 39 by the stable reference clock independent of the reproduced signal, the jitter of the reproduced signal can be absorbed. Accordingly, a so-called tangential servo and/or a color correcting circuit is not required. The digital video signal read out of the buffer memory 39 is converted into an analog signal by a D/A converter 40 and then fed to an output terminal 42 via an LPF 41.

The main functions of the system controller 18 are as follows:

1. Controlling various kinds of servo systems corresponding to the orders of operation parts, such as panel switches, remote controllers and the like, or corresponding to the state signal of servo system, thereby giving various operations to a player;

2. Reading frame number and chapter number from the control signal;

3. Generating signals for composing the frame number, chapter number, and the like, into a picture screen;

4. Synchronizing internal counters with horizontal synchronizing signal and vertical synchronizing signal, decoding the output signals of the counters, and generating various kinds of timing signals; and 5. Controlling the PLL for generating the clocking signals.

A specific arrangement for realizing the fourth one of those functions will be described hereunder.

In FIG. 31, a D-type flip-flop 180 receives the horizontal synchronizing signal ($\overline{HS}$) at its data input (D) and the $4f_{sc}$ clock signal at its clock input (CK). The Q output of the flip-flop 180 is fed to one input of NAND gate 181B. The NAND gate 181B further receives at its other input the horizontal synchronizing signal fed through an inverter 181A. The output of the NAND gate 181B is fed to the load input (L) of a 1H counter 183. The gate circuit 182A decodes the output of the 1H counter 183, produces the HS gate signal which is fed to the HV separating circuit 145d of FIG. 21 in a predetermined period of time, and produces a clock of a frequency $f_H$ synchronized with the horizontal synchronizing signal. The HS gate signal is used for the HV separating circuit 145a to detect the trailing edge of the horizontal synchronizing signal except equalizing pulses to thereby separate the horizontal signal. Though being continuously at its high level in the initial state, the HS gate signal loads the 1H counter 183 at the trailing edge of the synchronizing signal, and then is turned to its high level only for a predetermined period of time so as to detect the trailing edge of the horizontal synchronizing signal at a 1H period. If the 1H counter 183 is loaded to cause ½H shifting due to the trailing of the equalizing pulse in the initial state or for any other reason, the 1H counter 183 cannot be loaded after the vertical blanking period. To solve the problem, the system controller 18 detects this state and makes the HS gate signal to be at its continuous high level again. In the HV separating circuit 145d, a pulse of predetermined width is generated on the basis of the trailing edge of the horizontal synchronizing signal and is produced as a horizontal synchronizing signal. The clock HCK is a signal which has a duty factor of 50% with a high level in its front half portion starting from the trailing edge of the synchronizing signal and a low level in its rear half portion. The gate circuit 182A further produces various of timing signals within the period 1H to be fed to the respective circuits.

The vertical synchronizing signal (VS) of positive polarity is used as a clock input to each of the D-type flip-flops 184 and 185. The D-type flip-flop 184 receives, at its data input (D), the VS gate signal generated from the gate circuit 182B. When the vertical synchronizing signal rises in the period of high level of the VS signal, the flip-flop 184 is put into the state where the Q output thereof is at its high level while its $\overline{Q}$ output is at its low level. This state is maintained till the reset signal is turned to its low level. When the reset signal is turned to its low level, the Q and $\overline{Q}$ output signals are reversed. The D-type flip-flop 185 receives the clock HCK from the gate circuit 182A at its data input to judge whether the vertical synchronizing signal belongs to the field 1 or the field 2. In the field 1, the Q output of the flip-flop assumes its low level and the $\overline{Q}$ output assumes its high level because the vertical synchronizing signal rises when the clock HCK is at its high level. In the field 2, the Q output of the circuit 185 assumes its high level and the $\overline{Q}$ output assumes its low level because the vertical synchronizing signal rises when the clock HCK is at its low level. The D-type flip-flop 186 receives the Q output of the flip-flop 184 at its data input, the clock HCK at its clock input, and the Q output of the flip-flop 185 at its clear input. When the Q output of the flip-flop 184 turns to its high level, the Q output of the flip-flop 186 turns to its high level at the leading edge of the clock HCK in the case of the field 2. In the case of the field 1, the Q output of the flip-flop 186 is kept at its low level.

The J-K flip-flop 187 is arranged to receive the Q and $\overline{Q}$ outputs of the flip-flop 184 at its J and K inputs respectively, the clock HCK at its inverted clock input, and the $\overline{Q}$ output of the flip-flop 185 at its clear input. When the Q output of the flip-flop 184 turns to its high level, the Q output of the J-K flip-flop 187 is kept at its low level. Upon reception of the respective Q output signals of the D-type flip-flop 186 and the J-K flip-flop 187 at its two inputs, the NOR gate 188 produces an output to thereby load the one-frame counter 189 in the next stage and at the same time reset the D-type flip-flop circuit 184. As described above, the reason why a load pulse is produced by using a separate flip-flop for every field is that a sufficiently wide load pulse should be fed to the one-frame counter 189 at every field. The one-frame counter 189 is a 525-base counter for counting the clock HCK. Although the counter 189 is loaded by the clock HCK when the output of the NOR gate 188 is at its low level, the number to be loaded is controlled by the $\overline{Q}$ output of the D-type flip-flop 185 so that the field 2 is made larger in number by 263 than the field. The gate circuit 182B decodes the output of the one-frame counter 189 to thereby produce the VS gate signal in a predetermined period of time. The gate circuit 182B further produces a timing signal at the interval of H within one frame, and feeds the timing signal to the various circuits.

Figure 32:
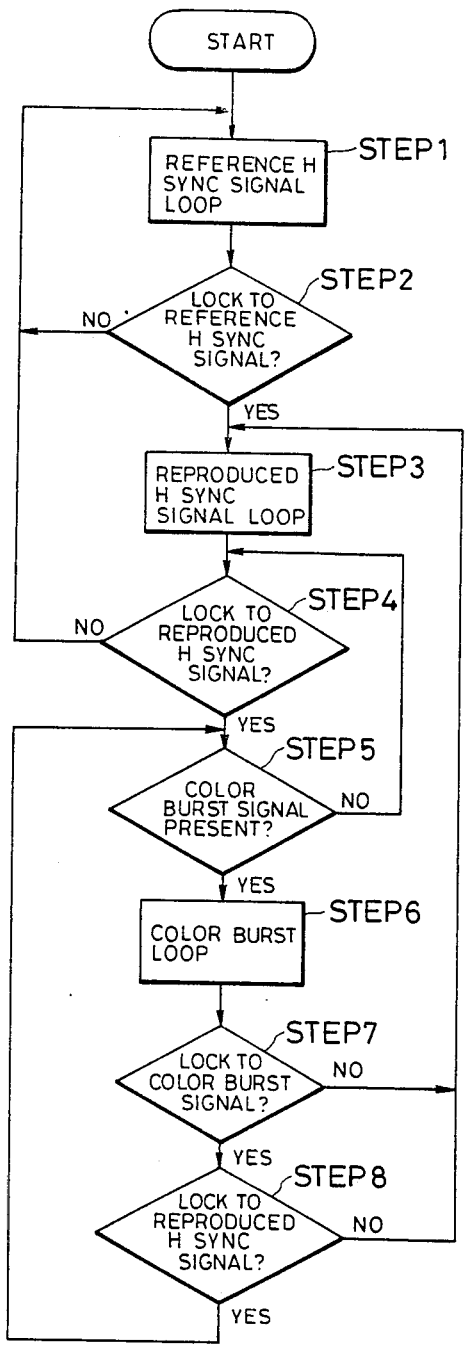
FIG. 32 is a flowchart of a predetermined function of the controller.

The fifth one of the foregoing five main functions of the system controller 18, that is, the function for controlling the PLL for generating clock signals, will be described hereunder by reference to the flowchart of FIG. 32. As described above, the PLL has two phase comparators, one locking the PLL to the reference horizontal synchronizing signal or the reproduced horizontal synchronizing signal and the other locking the PLL to the color burst signal. Three loops can be selected by changing-over the signal between the reference horizontal synchronizing signal and the reproduced horizontal synchronizing signal at the input part of the one phase comparator and by changing-over the phase comparator per se between the one and the other. In FIG. 32, in step 1, in the initial state, for example, immediately after the turning-on of the electric power supply, at the time of forced acceleration of the spindle motor, or the like, the loop of the PLL operates to make the PLL locked to the reference horizontal synchronizing signal generated from the reference signal generator 22 (FIG. 1B) which is used as a reference for the spindle servo. If a judgment in step 2 proves that the PLL has been locked to the reference horizontal synchronizing signal so that the sampling of the horizontal synchronizing signal from the reproduced video signal is enabled to be performed, the loop for the reproduced horizontal synchronizing signal is selected in step 3. At this time, if a judgment in step 4 proves that the locking cannot be made, the situation returns to step 1 and the loop for the reference horizontal synchronizing signal is selected again. After the locked state with the reproduced horizontal synchronizing signal is confirmed in step 4, the existence of the color burst signal is checked in step 5. If the color burst signal is absent, the situation returns to step 4 and the locked state with the reproduced horizontal synchronizing signal is kept. For example, the situation is put in this condition in the case of a monochromatic disk and in the vertical blanking period even in the case of a color disk. If the judgment in step 5 proved that the color burst signal is present, the loop of the PLL is selected for the color burst signal in step 6. Then, if a judgment proves that the locking with the color burst signal cannot be performed in step 7, the situation returns to step 3 and the loop for the reproduced horizontal synchronizing signal is selected. Otherwise, if the locked state is proved in the step 7, the color burst loop is kept. At this time, the locked state with the reproduced horizontal synchronizing signal is simultaneously monitored in step 8. If either the locking with the color burst signal or the locking with the reproduced horizontal synchronizing signal ceases, the state is regarded as unlocked and the procedure returns to the loop for the reproduced horizontal synchronizing signal in step 3. Thereafter, if the locking with the reproduced synchronizing signal cannot be performed in step 4, the situation further returns to the loop for the reference horizontal synchronizing signal in step 1.

The answer "NO" to the judgment in steps 4 and 7 means that the locking cannot be made within a predetermined period of time when these steps are passed the first time but indicates the unlocked state when these steps are passed in the second time and following.

While the system has been described above as to the specific arrangement of the various circuits thereof, it is to be understood that the system is featured in that signal processing between the A/D converter 4 and the D/A converter 40 is made completely in a digital manner. The digitization of signals can realize additional functions, such as grade up of the drop-out correcting signal from monochrome to color, chrominance inversion, high precision in Y-C separation owing to the frame memory, still picture reproduction in CLV, etc.

Figure 33A:
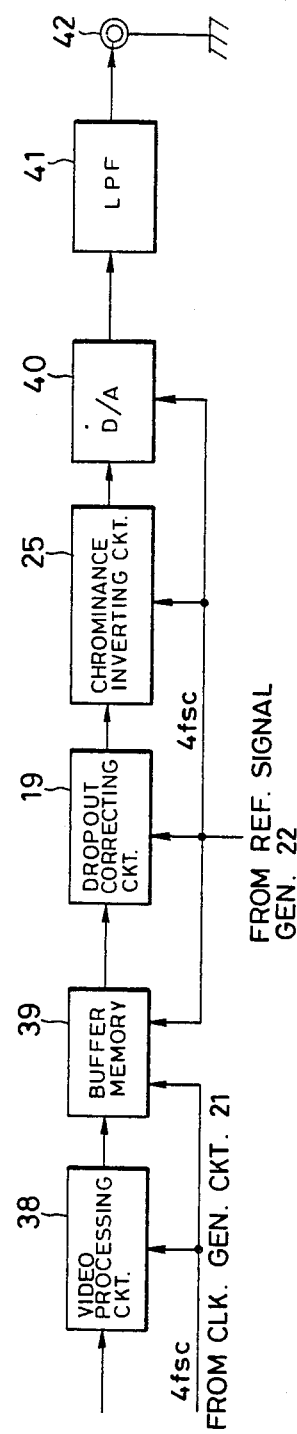
FIGS. 33A and 33B are block diagrams showing other modifications of the apparatus.
Figure 33B:
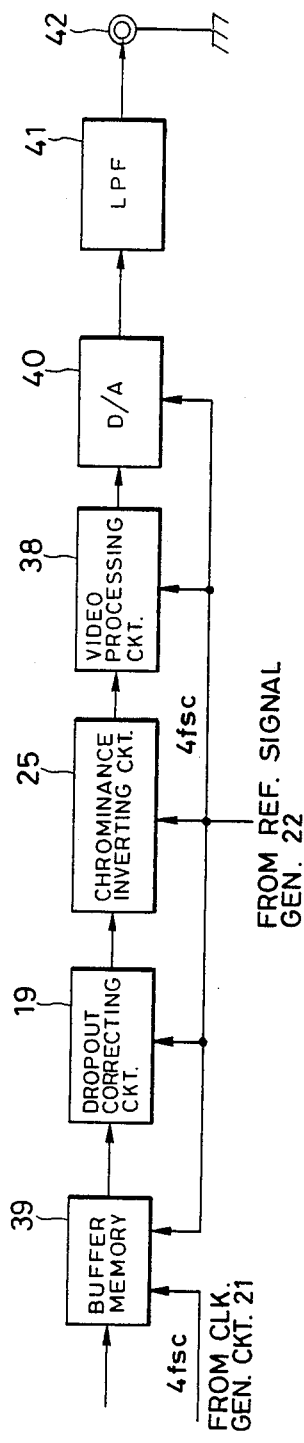

Although FIG. 1B shows the case where the circuits next to the adder 12 are arranged in the order of the drop-out correcting circuit 19, the chrominance inverting circuit 25, the video processing circuit 38 and the buffer memory 39, the invention is not limited to the arrangement of FIG. 1B. For example, as shown in FIGS. 33A and 33B, the order of the drop-out correcting circuit 19 combined with the chrominance inverting circuit 25, the video processing circuit 38 and the buffer storage 39 may be exchanged with each other in the arrangements of the two figures. However, in the case where the buffer storage 39 is disposed in the first stage as shown in FIG. 33B, resynchronization or delay for the control signal and the timing signal is required for the two other circuits because the writing and reading operation of the buffer storage 39 is performed asynchronously. In the case where the combination of the drop-out correcting circuit 19 and the chrominance inverting circuit 25 is disposed in the rear of the video processing circuit 38 as shown in FIG. 33A, it is required to provide a control signal for inhibiting the drop-out correction by the drop-out correcting circuit 19 at a character portion in the case where a character is inserted in the video processing circuit 38.

Figure 34:
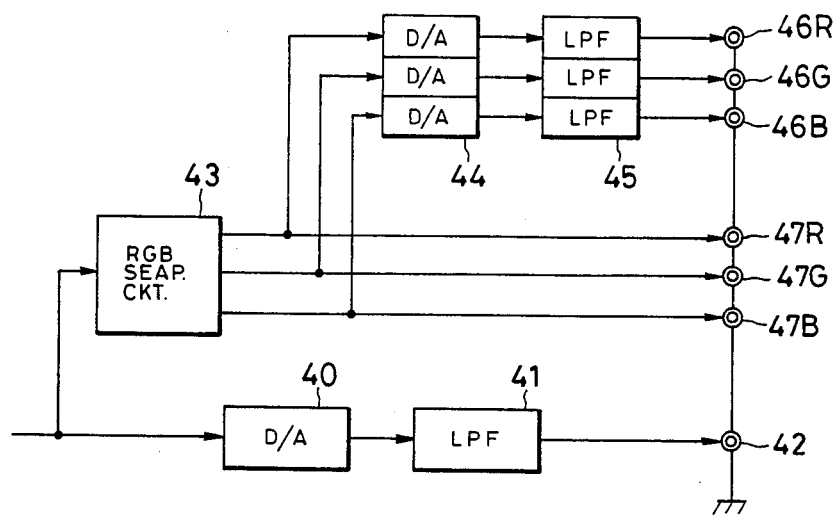
FIG. 34 is a block diagram showing a further modification.

As shown in FIG. 34, also RGB color separation can be performed in a digital manner. That is, digital signals separated by an RGB separating circuit 43 are converted into analog signals by respective D/A converters 44 and the thus converted analog signals are fed to respective analog output terminals 46R, 46G and 46B through respective LPFs 45. If these terminals are electrically connected to the RGB input terminals of a monitor TV (television) set, the picture quality can be improved because the RGB separating circuit incorporated in the TV set becomes unnecessary. Furthermore, in the case of using a so-called digital TV set capable of processing digital RGB signals, the digital signals separated by the RGB separating circuit 43 can be directly fed to digital output terminals 47R, 47G and 47B without passing through the D/A converters.

Since the system is featured in that the clock for the A/D converter 4 is set to 4Nf$_{sc}$ (N being an integer not smaller than 2) and another clock of 4f$_{sc}$ is locked with the color burst signal contained in the video signal, the RGB separation (demodulation) can be easily performed. The case where demodulation is carried out by using R-Y and B-Y signals will be described hereunder, while the same demodulation can be made by the use of I and Q signals.

Figure 35:
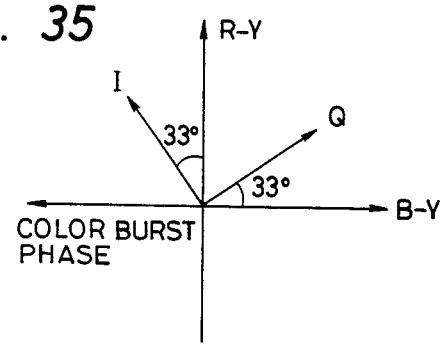
FIG. 35 is a phase characteristic graph of a color signal for explaining the principle of RGB separation in FIG. 34.

In the NTSC method, a color signal is modulated to have two orthogonal phases as shown in FIG. 35 and is frequency-multiplexed with a luminance signal. The relation among the R, G and B signals and the luminance signal Y is expressed by the following equation.

$$Y = 0.03R + 0.59G + 0.11B \tag{1}$$

The color signal C in the video signal is expressed by the following equation:

$$C = \frac{R-Y}{1.14} \cos\omega_c t + \frac{B-Y}{2.03} \sin\omega_c t \tag{2}$$

$$= I \cdot \cos(\omega_c t + 33°) + Q \cdot \sin(\omega_c t + 33°) \tag{3}$$

where $\omega_c$ is the angular frequency of the color carrier, and $\omega_c = 2\pi \times 3.58$ MHz.

Figure 36:
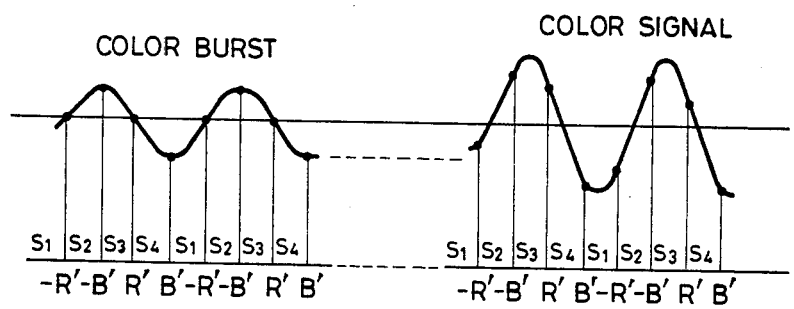
FIG. 36 is a waveform diagram of the signal represented in sample points.

When the phase with a sampling frequency of 4f$_{sc}$ is locked at 0° to the color burst signal, the sampling points can be calculated from FIG. 35 and equation (2). The results are $\pm(R-Y)/1.14$ and $\pm(B-R)/2.03$ as shown in FIG. 36. From the equations (1) and (2), R, G and B signals can be respectively expressed by the following equations (4) to (6).

$$R = 1.14 \cdot \frac{R-Y}{1.14} + Y \tag{4}$$

$$G = -\frac{0.03}{0.59} \cdot 1.14 \cdot \frac{R-Y}{1.14} - \frac{0.11}{0.59} \cdot 2.03 \cdot \frac{B-Y}{2.03} + Y \tag{5}$$

$$B = 2.03 \cdot \frac{B-Y}{2.03} + Y \tag{6}$$

The I and Q signals can be obtained when the phase is locked at $\pm 33°$ or $\pm 57°$ with respect to the color burst signal. It is apparent from the description that RGB separation can be easily realized by the locking of the clock with the color burst signal.

Although the embodiments show the case where the system is applied to the NTSC type video players, the system is applicable to reproduced signal processing apparatus for VTRs, PAL type and SECAM type video-disk players, etc.

As described above, according to the present invention, FM video signal can be digitized and signal processing can be made in a digital manner. Accordingly, the major part of circuits can be digitized so as to be suitable for LSI structure. Accordingly, reduction of manufacturing cost can be realized by the double reason of mass production and reduction of parts requiring adjustment. Furthermore, various kinds of signal processing can be realized by the digitization of FM video signal. Accordingly, additional functions as well as improvement of picture quality can be easily attained.

What is claimed is:

1. A video signal reproducing apparatus comprising:
    an analog-to-digital converter for converting an FM video signal into a digital signal;
    a first digital filter for extracting a video signal component necessary for detecting a video signal from an output of said analog-to-digital converter;
    an FM demodulating circuit for demodulating an output of said first digital filter;
    a second digital filter for extracting a base-band video signal component from an output of said FM demodulating circuit;
    a color signal source providing a clock signal synchronized with a horizontal synchronizing signal or a color burst signal contained in an output of said second digital filter;
    buffer memory for storing an output of said second digital filter by using said clock signal and for successively releasing information of the base band digital video signal component stored in said buffer memory in synchronism with a predetermined reference clock signal; and
    a digital-to-analog converter for converting the base-band digital video signal component released from said buffer memory into an analog signal.

2. A video signal reproducing apparatus according to claim 1 wherein f$_{sc}$ represents a subcarrier frequency and said clock signal source provides:
    a sampling clock signal for said analog-to-digital converter and a signal processing clock signal for said first digital filter, said FM detecting circuit, and an input stage of said second digital filter, each of said sampling clock signal and said signal processing clock signal being set to have a frequency of 4Nf$_{sc}$ (N being an integer not smaller than 2) synchronized with said horizontal synchronizing signal or said color burst signal contained in the output of said second digital filter;
    another signal processing clock signal for an output stage of said second digital filter and for information storing of said buffer memory set to have a frequency of 4f$_{sc}$ synchronized with said color burst signal;
    a further signal processing clock signal for information output of said buffer memory and for said digital-to-analog converter which is set to a reference clock signal of a frequency of 4f$_{sc}$.

3. A video signal reproducing apparatus according to claim 1, wherein said FM detecting circuit includes a Hilbert transformer.

* * * * *